United States Patent
Liben et al.

(10) Patent No.: US 12,451,754 B2
(45) Date of Patent: Oct. 21, 2025

(54) ELECTRIC MOTOR WITH INTEGRATED INVERTER AND SHARED COOLING SYSTEM

(71) Applicant: H3X TECHNOLOGIES INC., Louisville, CO (US)

(72) Inventors: Max Meyer Liben, Louisville, CO (US); Jason Jerome Sylvestre, Louisville, CO (US); Eric Paul MacIolek, Louisville, CO (US)

(73) Assignee: H3X Technologies INC., Louisville, CO (US)

( * ) Notice: Subject to any disclaimer, the term of this patent is extended or adjusted under 35 U.S.C. 154(b) by 285 days.

(21) Appl. No.: 18/034,767

(22) PCT Filed: Nov. 2, 2021

(86) PCT No.: PCT/US2021/057691
§ 371 (c)(1),
(2) Date: May 1, 2023

(87) PCT Pub. No.: WO2022/098636
PCT Pub. Date: May 12, 2022

(65) Prior Publication Data
US 2023/0412035 A1    Dec. 21, 2023

Related U.S. Application Data

(60) Provisional application No. 63/109,340, filed on Nov. 3, 2020.

(51) Int. Cl.
*H02K 5/20* (2006.01)
*B33Y 80/00* (2015.01)
(Continued)

(52) U.S. Cl.
CPC .............. *H02K 5/203* (2021.01); *B33Y 80/00* (2014.12); *H02K 5/20* (2013.01); *H02K 9/08* (2013.01);
(Continued)

(58) Field of Classification Search
CPC . H02K 9/10; H02K 9/08; H02K 11/33; H02K 5/203; H02K 11/05; H02K 9/19–20; H02K 5/20; B33Y 80/00
See application file for complete search history.

(56) References Cited

U.S. PATENT DOCUMENTS 4,498,628 A    2/1985 Tucker
4,528,469 A *  7/1985 Prenner .................. H02K 1/185
                                                310/59

(Continued)

FOREIGN PATENT DOCUMENTS

CA    2485765    12/2013
CN    109560670  4/2019
(Continued)

OTHER PUBLICATIONS

International Search Report and Written Opinion for PCT/2021/057691, mailed Mar. 9, 2022, 23 pages.

(Continued)

*Primary Examiner* — Oluseye Iwarere
*Assistant Examiner* — Daniel K Schlak
(74) *Attorney, Agent, or Firm* — CASIMIR JONES, S.C.; Brian F. Bradley

(57) ABSTRACT

An electric motor includes a housing with an inner surface and an outer surface positioned radially outward from the inner surface. The electric motor includes a stator coupled to the inner surface, an electrical component coupled to the outer surface, and a cooling channel positioned within the housing between the inner surface and the outer surface. The (Continued)

housing is additively manufactured with the cooling channel formed therein. The electric motor includes a bus bar assembly formed as an axial stack.

18 Claims, 13 Drawing Sheets

(51) Int. Cl.
 *H02K 9/08* (2006.01)
 *H02K 9/19* (2006.01)
 *H02K 11/33* (2016.01)
 *H02K 15/14* (2025.01)
 *B22F 10/25* (2021.01)
 *H02K 7/116* (2006.01)

(52) U.S. Cl.
 CPC .............. *H02K 9/19* (2013.01); *H02K 11/33* (2016.01); *H02K 15/14* (2013.01); *B22F 10/25* (2021.01); *H02K 7/116* (2013.01)

(56) References Cited

U.S. PATENT DOCUMENTS

| | | | |
|---|---|---|---|
| 5,491,370 A | 2/1996 | Schneider et al. | |
| 6,201,365 B1 | 3/2001 | Hara et al. | |
| 6,809,441 B2 | 10/2004 | Randall | |
| 6,930,417 B2 | 8/2005 | Kaneko et al. | |
| 7,122,933 B2 | 10/2006 | Horst et al. | |
| 7,148,598 B2 | 12/2006 | Ionel et al. | |
| 7,242,128 B2 | 7/2007 | Innami et al. | |
| 7,332,845 B2 | 2/2008 | Heideman et al. | |
| 7,567,053 B2 | 7/2009 | Hauenstein | |
| 7,629,715 B1* | 12/2009 | Sortore | H02K 5/203 310/52 |
| 7,652,402 B2 | 1/2010 | Kinoshita et al. | |
| 7,737,598 B2 | 6/2010 | Ionel | |
| 7,775,060 B2 | 8/2010 | Nakajima et al. | |
| 7,821,175 B2 | 10/2010 | Ionel | |
| 7,841,431 B2 | 11/2010 | Zhou | |
| 7,936,099 B2 | 5/2011 | Fricke | |
| 7,960,948 B2 | 6/2011 | Saban et al. | |
| 8,004,140 B2 | 8/2011 | Alexander et al. | |
| 8,018,110 B2 | 9/2011 | Alexander et al. | |
| 8,183,723 B2 | 5/2012 | Fee et al. | |
| 8,685,534 B2 | 4/2014 | Smith et al. | |
| 8,779,641 B2 | 7/2014 | Fujii et al. | |
| 8,987,966 B2 | 3/2015 | Zhao et al. | |
| 8,987,971 B2 | 3/2015 | Reddy et al. | |
| 9,030,063 B2 | 5/2015 | Rawlinson et al. | |
| 9,048,712 B2 | 6/2015 | Lee et al. | |
| 9,102,242 B2 | 8/2015 | Hauenstein | |
| 9,120,389 B1 | 9/2015 | Rawlinson | |
| 9,287,742 B2 | 3/2016 | Reddy et al. | |
| 9,356,483 B2 | 5/2016 | Stiesdal | |
| 9,419,482 B2 | 8/2016 | Lee et al. | |
| 9,520,751 B2 | 12/2016 | Raminosoa et al. | |
| 9,559,569 B2 | 1/2017 | Huang et al. | |
| 9,762,106 B2 | 9/2017 | Gauthier et al. | |
| 9,985,490 B2 | 5/2018 | Owen | |
| 10,056,806 B2 | 8/2018 | Hatfield et al. | |
| 10,144,507 B2 | 12/2018 | Chretien | |
| 10,199,892 B2 | 2/2019 | Ekin et al. | |
| 10,250,096 B2 | 4/2019 | Nishikawa et al. | |
| 10,348,168 B2 | 7/2019 | Shrestha et al. | |
| 10,457,135 B2 | 10/2019 | Tang et al. | |
| 10,476,358 B2 | 11/2019 | Huang et al. | |
| 10,644,571 B2 | 5/2020 | Hatch | |
| 10,673,293 B2 | 6/2020 | Lee | |
| 10,763,711 B2 | 9/2020 | Han et al. | |
| 10,998,789 B2 | 5/2021 | Tategata et al. | |
| 11,025,108 B2 | 6/2021 | Yun et al. | |
| 11,177,761 B1 | 11/2021 | Kabir et al. | |
| 11,342,803 B2 | 5/2022 | Hopkins et al. | |
| 11,545,880 B2 | 1/2023 | Agapiou et al. | |
| 2004/0164625 A1* | 8/2004 | Grundl | H02K 5/20 310/16 |
| 2005/0001503 A1 | 1/2005 | Hans | |
| 2005/0162025 A1 | 7/2005 | Sivasubramaniam et al. | |
| 2005/0211162 A1 | 9/2005 | Osawa | |
| 2006/0028087 A1 | 2/2006 | Ionel et al. | |
| 2006/0061227 A1 | 3/2006 | Heideman et al. | |
| 2006/0244266 A1* | 11/2006 | Ganev | H02K 11/33 290/52 |
| 2009/0026859 A1 | 1/2009 | Kinoshita et al. | |
| 2010/0085706 A1 | 4/2010 | Savant | |
| 2010/0288586 A1* | 11/2010 | Gorbounov | B66B 11/0438 187/250 |
| 2010/0289370 A1 | 11/2010 | Roth et al. | |
| 2010/0327680 A1* | 12/2010 | Miyachi | H02K 11/028 310/71 |
| 2010/0327709 A1* | 12/2010 | Minato | H02K 11/33 361/736 |
| 2012/0098391 A1* | 4/2012 | Yamasaki | H02K 11/33 310/68 D |
| 2012/0274158 A1* | 11/2012 | Chun | H02K 5/203 310/53 |
| 2014/0083218 A1 | 3/2014 | Fukaya et al. | |
| 2015/0083505 A1 | 3/2015 | Pearce, Jr. et al. | |
| 2015/0097450 A1* | 4/2015 | Xu | H02K 9/197 310/54 |
| 2015/0311763 A1* | 10/2015 | Hufnagel | H02K 9/223 310/43 |
| 2015/0318772 A1 | 11/2015 | Jahshan | |
| 2016/0013692 A1 | 1/2016 | Wawrzyniak et al. | |
| 2016/0276895 A1* | 9/2016 | Aizawa | H02K 3/46 |
| 2016/0380510 A1 | 12/2016 | Niwa | |
| 2017/0136697 A1 | 5/2017 | Kia et al. | |
| 2018/0076691 A1 | 3/2018 | Cheng | |
| 2018/0097416 A1 | 4/2018 | Dang | |
| 2018/0175709 A1* | 6/2018 | Kim | H05K 7/2089 |
| 2018/0205284 A1* | 7/2018 | Huang | H02K 1/165 |
| 2018/0288907 A1* | 10/2018 | Richards | H01L 23/473 |
| 2018/0323676 A1 | 11/2018 | Rippel | H02K 15/14 |
| 2018/0351420 A1* | 12/2018 | Takano | H02K 5/203 |
| 2018/0351435 A1* | 12/2018 | Takano | H02K 9/223 |
| 2019/0015923 A1* | 1/2019 | O'Neill | B33Y 70/00 |
| 2019/0099945 A1* | 4/2019 | Hsing | C04B 28/02 |
| 2019/0103777 A1* | 4/2019 | Pal | H02K 3/527 |
| 2019/0168305 A1 | 6/2019 | Boyle | |
| 2019/0181717 A1* | 6/2019 | Zhou | H02K 5/20 |
| 2019/0229584 A1* | 7/2019 | Shinozaki | F28D 15/025 |
| 2020/0031420 A1 | 1/2020 | Aunkst et al. | |
| 2020/0127593 A1 | 4/2020 | Sheeks et al. | |
| 2020/0358325 A1* | 11/2020 | Yun | H02K 5/203 |
| 2020/0373808 A1 | 11/2020 | St. Rock et al. | |
| 2021/0104932 A1 | 4/2021 | Mastrocola et al. | |
| 2021/0175771 A1* | 6/2021 | Tanabe | H02M 7/5387 |
| 2021/0367459 A1 | 11/2021 | Gervais et al. | |
| 2022/0029500 A1* | 1/2022 | Sibbach | H02K 5/20 |
| 2022/0069653 A1 | 3/2022 | Rippel et al. | |
| 2022/0140673 A1 | 5/2022 | Okamura et al. | |
| 2022/0407395 A1* | 12/2022 | McDaniel | H02K 9/22 |
| 2023/0038386 A1* | 2/2023 | Goykhman | H02K 9/197 |

FOREIGN PATENT DOCUMENTS

| | | | |
|---|---|---|---|
| CN | 210337544 | 4/2020 | |
| CN | 210578076 | 5/2020 | |
| CN | 210578076 U * | 5/2020 | .............. H02K 5/20 |
| CN | 112994329 | 6/2021 | |
| DE | 102005021138 A1 * | 11/2006 | .............. H02K 5/203 |
| DE | 102015219763 A1 * | 4/2017 | .............. H02K 5/203 |
| DE | 102018219253 | 5/2020 | |
| EP | 2160816 | 3/2010 | |
| EP | 2356734 | 8/2011 | |
| EP | 3211767 | 8/2017 | |
| EP | 3544156 | 9/2019 | |
| FR | 3068536 | 1/2019 | |
| JP | 2011244673 | 12/2011 | |
| KR | 2016119986 | 10/2016 | |
| WO | WO2010054824 | 5/2010 | |

(56) References Cited

FOREIGN PATENT DOCUMENTS

| WO | WO2018115404 | 6/2018 |
|---|---|---|
| WO | WO2020157500 | 6/2020 |
| WO | WO2020247326 | 12/2020 |

OTHER PUBLICATIONS

Silbernagel, Cassidy. Investigation of the Design, Manufacture and Testing of Additively Manufactured Coils for Electric Motor Applications. Univ of Nottingham. Jun. 2019; 250 pages.

Simpson, N. , & Mellor, P. H. Additive manufacturing of shaped profile windings for minimal AC loss in gapped inductors. Department of Electrical and Electronic Engineering, University of Bristol, Bristol, UK. 2017; 8 pages https://doi.org/10.1109/IEMDC.2017.8002337.

N. Simpson and P. H. Mellor. Additive Manufacturing of Shaped Profile Windings for Minimal AC Loss in Electrical Machines. Department of Electrical and Electronic Engineering, University of Bristol, Bristol, UK. 2020; Transactions on Industry Applications, 56(3), 2510-2519. https://doi.org/10.1109/TIA.2020.2975763.

Blain, Loz. Equipmake announces the world's most power-dense electric motor. New Atlas, Automotive. 2020; 5 pages.

Stuart Birch. Equipmake's Ampere powerful lightweight motor will spin up to 30,000 rpm. SAE.org. 2020; 3 pages.

Sarlioglu, Bulent. Electrification of Aircraft and Vehicles Current Statue and Future Trends. WEMPECK—Wisconsin Electric Machines and Power Electronics Consortium; UW-Madison. 2021; 69 pages.

O'Neal, Bridget. Additive Drives: 3D Printed Winding for Electric Cars. 3dprint.com. 2020; 6 pages.

T. M. Jahns, "Improved Reliability in Solid-State AC Drives by Means of Multiple Independent Phase Drive Units," IEEE Trans. Ind. Appl., vol. IA-16, No. 3, pp. 321-331, May 1980, doi: 10.1109/TIA.1980.4503793.

N. R. Brown, T. M. Jahns and R. D. Lorenz, "Power Converter Design for an Integrated Modular Motor Drive," 2007 IEEE Industry Applications Annual Meeting, New Orleans, LA, USA, 2007, pp. 1322-1328, doi: 10.1109/07IAS.2007.205.

T. M. Jahns and H. Dai, "The past, present, and future of power electronics integration technology in motor drives," in CPSS Transactions on Power Electronics and Applications, vol. 2, No. 3, pp. 197-216, Sep. 2017, doi: 10.24295/CPSSTPEA.2017.00019.

Choi, G., Xu, Z., Li, M., Gupta, S. et al., "Development of Integrated Modular Motor Drive for Traction Applications," SAE Int. J. Engines 4(1):286-300, 2011, https://doi.org/10.4271/2011-01-0344.

N. Bianchi, M. D. Pre, and S. Bolognani, "Design of a Fault-Tolerant IPM Motor for Electric Power Steering," IEEE Trans. Veh. Technol., vol. 55, No. 4, pp. 1102-1111, Jul. 2006, doi: 10.1109/TVT.2006.877716.

Wei Zhang, Mingyao Lin, Da Xu, Xinghe Fu, and Li Hao, "Novel Fault-Tolerant Design of Axial Field Flux-Switching Permanent Magnet Machine," IEEE Trans. Appl. Supercond., vol. 24, No. 3, pp. 1-4, Jun. 2014, doi: 10.1109/TASC.2014.2304841.

J. Swanke, D. Bobba, T. Jahns, and B. Sarlioglu, "Design of High-Speed Permanent Magnet Machine for Aerospace Propulsion," Aug. 2019. doi: 10.2514/6.2019-4483.

J. Swanke, D. Bobba, T. M. Jahns and B. Sarlioglu, "Comparison of Modular PM Propulsion Machines for High Power Density," 2019 IEEE Transportation Electrification Conference and Expo (ITEC), Detroit, MI, USA, 2019, pp. 1-7, doi: 10.1109/ITEC.2019.8790587.

P. H. Mellor, J. Yon, J. L. Baker, D. North, and J. D. Booker, "Electromagnetic and thermal coupling within a fault-tolerant aircraft propulsion motor," in 2017 IEEE International Electric Machines and Drives Conference (IEMDC), May 2017, pp. 1-7. doi: 10.1109/IEMDC.2017.8002214.

S. Nall and P. H. Mellor, "Compact direct-drive permanent magnet motor for a UAV rotorcraft with improved faulted behavior through operation as four separate three-phase machines," in IET Conference Publications, 2008, No. 538 CP, pp. 245-249. doi:10.1049/cp:20080520.

E. Jung, H. Yoo, S.-K. Sul, H.-S. Choi, and Y.-Y. Choi, "A Nine-Phase Permanent-Magnet Motor Drive System for an Ultrahigh-Speed Elevator," IEEE Trans. Ind. Appl., vol. 48, No. 3, pp. 987-995, May 2012, doi: 10.1109/TIA.2012.2190472.

M. Barcaro, N. Bianchi, and F. Magnussen, "Analysis and Tests of a Dual Three-Phase 12-Slot 10-Pole Permanent-Magnet Motor," IEEE Trans. Ind. Appl., vol. 46, No. 6, pp. 2355-2362, Nov. 2010, doi: 10.1109/TIA.2010.2070784.

J. W. Bennett, B. C. Mecrow, D. J. Atkinson, and G. J. Atkinson, "Safety-critical design of electromechanical actuation systems in commercial aircraft," IET Electr. Power Appl., vol. 5, No. 1, p. 37, 2011, doi: 10.1049/iet-epa.2009.0304.

Supplementary EP Search Report, EP Patent Application No. 21889904.5, dated Oct. 4, 2024, 8 pages.

\* cited by examiner

ELECTRIC MOTOR WITH INTEGRATED INVERTER AND SHARED COOLING SYSTEM

CROSS-REFERENCE TO RELATED APPLICATIONS

This application claims priority to U.S. Provisional Patent No. 63/109,340 filed on Nov. 3, 2020, the entire contents of which are incorporated herein by reference.

BACKGROUND

The Advanced Research Projects Agency—Energy (ARPA-E), a U.S. government agency tasked with promoting and funding research and development of advanced energy technologies, has determined that to complete a 5-hour flight profile typical of a narrow-body commercial airliner (e.g., a Boeing 737), an all-electric propulsion system must have a specific power of greater than 12 kilowatts per kilogram (kW/kg) and a cruise efficiency (e.g., output mechanical power/input electric power) of greater than 93%. These technically demanding figures are well beyond state-of-the-art designs, which typically have a specific power of 4 kilowatts per kilogram at similar efficiencies.

SUMMARY

The Summary is provided to introduce a selection of concepts that are further described below in the Detailed Description. This Summary is not intended to identify key or essential features of the claimed subject matter, nor is it intended to be used as an aid in limiting the scope of the claimed subject matter.

One aspect of the present disclosure provides an electric motor including a housing with an inner surface and an outer surface positioned radially outward from the inner surface. The electric motor further includes a stator coupled to the inner surface, an electrical component coupled to the outer surface, and a cooling channel positioned within the housing between the inner surface and the outer surface. The housing is additively manufactured with the cooling channel formed therein.

In some embodiments, the cooling channel helically extends along a longitudinal axis of the housing.

In some embodiments, the cooling channel includes a radially inward cooling surface and a radially outward cooling surface parallel to the radially inward cooling surface.

In some embodiment, the cooling channel includes a first side surface extending from the radially inward cooling surface, the first side surface is non-orthogonal to the radially inward cooling surface, and wherein the cooling channel includes a second side surface extending from the radially outward cooling surface, the second side surface is non-orthogonal to the radially outward cooling surface, and wherein the first side surface and the second side surface intersect at a point.

In some embodiments, the outer surface is a first outer surface, and wherein the housing further includes a second outer surface.

In some embodiments, the cooling channel is positioned between the inner surface and the second outer surface.

In some embodiments, the first outer surface and the second outer surface are oriented to intersect at an angle of 60 degrees.

In some embodiments, the first outer surface and the second outer surface are oriented to intersect at an angle of 30 degrees.

In some embodiments, the housing further includes a third outer surface, a fourth outer surface, a fifth outer surface, and a sixth outer surface, wherein the electrical component is a first inverter branch, and wherein a second inverter branch is coupled to the third outer surface, and a third inverter branch is coupled to the fifth outer surface, and wherein a first capacitor is coupled to the second outer surface, a second capacitor is coupled to the fourth outer surface, and a third capacitor is coupled to the sixth outer surface.

In some embodiments, the housing further includes a coolant inlet and a coolant outlet additively manufactured therein, wherein the coolant inlet and the coolant outlet are fluidly coupled to the cooling channel.

In some embodiments, the electric motor further includes a liquid coolant configured to flow through the cooling channel.

In some embodiments, the electric motor further includes an airflow configured to flow through the cooling channel, and wherein the cooling channel is formed between a first fin and a second fin.

In some embodiments, the electric motor further includes a rotor positioned within the stator.

In some embodiments, the housing includes an axial end face coupled to a transmission, wherein the transmission includes a transmission case, a plurality of gears, a bearing, and a lubricant; and wherein the transmission case is abutted against and thermally coupled to the axial end face.

Another aspect of the present disclosure provides a method of additively manufacturing an electric motor housing including forming a first axial end surface in a first layer, and forming a cooling channel, a radially inward surface, and a radially outward surface in a second layer. The cooling channel is positioned between the radially inward surface and the radially outer surface. The method further includes forming a second axial end surface in a third layer.

In some embodiments, the method further includes smoothing a surface by machining.

In some embodiments, the method further includes flushing a material out of the cooling channel.

In some embodiments, the cooling channel is formed without an additional support component.

In some embodiments, forming the first layer, the second layer, and the third layer is with direct metal laser sintering.

In some embodiments, forming the first layer, the second layer, and the third layer is with binder jetting.

Another aspect of the present disclosure provides an electric motor stator including a yoke with an inner surface and an outer surface, a first integral tooth extending radially inward from the yoke, a second integral tooth extending radially inward from the yoke, and a segmented tooth extending radially inward from the yoke. The segmented tooth is positioned circumferentially between the first integral tooth and the second integral tooth.

In some embodiments, the first integral tooth includes a first side surface, a second side surface, and a radially inward surface extending between the first side surface and the second side surface.

In some embodiments, the first side surface and the second side surface extend radially inward from the inner surface of the yoke to the radially inward surface.

In some embodiments, the radially inward surface is arcuate.

In some embodiments, the first side surface and the second side surface are parallel.

In some embodiments, the segmented tooth includes an extending portion that extends from the inner surface of the yoke, wherein the extending portion includes a third side surface, a fourth side surface, and a second radially inward surface extending between the third side surface and the fourth side surface. The second radially inward surface is arcuate and the third side surface and the fourth side surface are parallel.

In some embodiments, a connection portion of the segmented tooth is received within a corresponding slot formed in the yoke.

In some embodiments, the connection portion is dovetail shaped.

In some embodiments, the segmented tooth abuts against the inner surface of the yoke.

In some embodiments, the segmented tooth is a first segmented tooth and the electric motor stator further includes a second segmented tooth, the second integral tooth positioned circumferentially between the first segmented tooth and the second segmented tooth.

In some embodiments, the electric motor stator further includes a first winding wound around the first integral tooth and a second winding wound around the second integral tooth, wherein the segmented tooth is positioned between the first winding and the second winding.

In some embodiments, no winding is wound around the segmented tooth.

In some embodiments, the first winding is additively manufactured.

In some embodiments, the outer surface of the yoke is a single continuous cylindrical surface.

In some embodiments, the segmented tooth includes a first axial segment and a second axial segment.

In some embodiments, the yoke includes a first axial end face and a second axial end face, the segmented tooth has an axial length that extends from the first axial end face to the second axial end face and a radial length that extends from the inner surface; wherein the ratio of the longitudinal length to the radial length is 15 to 1.

Another aspect of the present disclosure provides an electric motor including a housing with a circular bore, and a stator including a yoke with an inner surface and an outer surface, a first integral tooth extending radially inward from the yoke, a second integral tooth extending radially inward from the yoke, and a segmented tooth extending radially inward from the yoke. The segmented tooth is positioned circumferentially between the first integral tooth and the second integral tooth, and the stator is received within the circular bore. An interference fit is formed between the stator and the housing.

In some embodiments, the electric motor further includes a rotor positioned within the stator.

In some embodiments, a dovetail portion of the segmented tooth is received within a corresponding slot formed in the yoke.

In some embodiments, the electric motor further includes a first winding wound around the first integral tooth and a second winding wound around the second integral tooth, wherein the segmented tooth is positioned between the first winding and the second winding, and wherein no winding is wound around the segmented tooth.

Another aspect of the present disclosure provides an electric motor including a stator including a plurality of stator windings and a bus bar assembly. The bus bar assembly includes a first bus bar, a second bus bar, a third bus bar, and a neutral bus bar. The first bus bar, the second bus bar, the third bus bar, and the neutral bus bar form an axial stack.

In some embodiments, the first bus bar, the second bus bar, and the third bus bar are identically shaped.

In some embodiments, the stator includes a first axial end face, a second axial end face, and a longitudinal axis that extends between the first axial end face and the second axial end face.

In some embodiments, the first bus bar is positioned along the longitudinal axis between the first axial end face and the second bus bar.

In some embodiments, the second bus bar is positioned along the longitudinal axis between the first bus bar and the third bus bar.

In some embodiments, the third bus bar is positioned along the longitudinal axis between the second bus bar and the neutral bus bar.

In some embodiments, the first bus bar includes a first planar surface, a second planar surface, a radially inward facing surface, and a radially outward facing surface.

In some embodiments, the first bus bar includes a first inner notch and a second inner notch formed in the radially inward facing surface.

In some embodiments, the first bus bar includes a first outer notch, a second outer notch, and a third outer notch formed in the radially outward facing surface.

In some embodiments, a portion of one of the plurality of stator windings is positioned within the first inner notch, wherein the portion is spaced from the first bus bar.

In some embodiments, the first bus bar includes a first terminating end and a second terminating end.

In some embodiments, one of the plurality of windings is electrically coupled to the first terminating end, and another one of the plurality of windings is electrically coupled to the second terminating end.

In some embodiments, the neutral bus bar includes a first planar surface, a second planar surface, an inner circumferential surface, and an outer circumferential surface.

In some embodiments, the inner circumferential surface is circular.

In some embodiments, the neutral bus bar includes a plurality of notches formed in the outer circumferential surface.

In some embodiments, the electric motor further includes a rotor shaft extending through the bus bar assembly.

In some embodiments, the first bus bar includes a dielectric layer.

In some embodiments, an outer diameter of the first bus bar is equal to an outer diameter of the stator.

In some embodiments, the electric motor further includes a ferrule coupled to the first bus bar, wherein the ferrule extends through the axial stack, and wherein a portion of one of the plurality of stator windings is positioned within the ferrule.

In some embodiments, a plurality of cutouts is formed in the first bus bar, the second bus bar, the third bus bar, and the neutral bus bar; wherein the plurality of cutouts are axially aligned.

Other aspects of the disclosure will become apparent by consideration of the detailed description and accompanying drawings.

BRIEF DESCRIPTION OF THE DRAWINGS

The accompanying figures and examples are provided by way of illustration and not by way of limitation. The foregoing aspects and other features of the disclosure are explained in the following description, taken in connection with the accompanying example figures (also "FIG.") relating to one or more embodiments.

Figure 1:
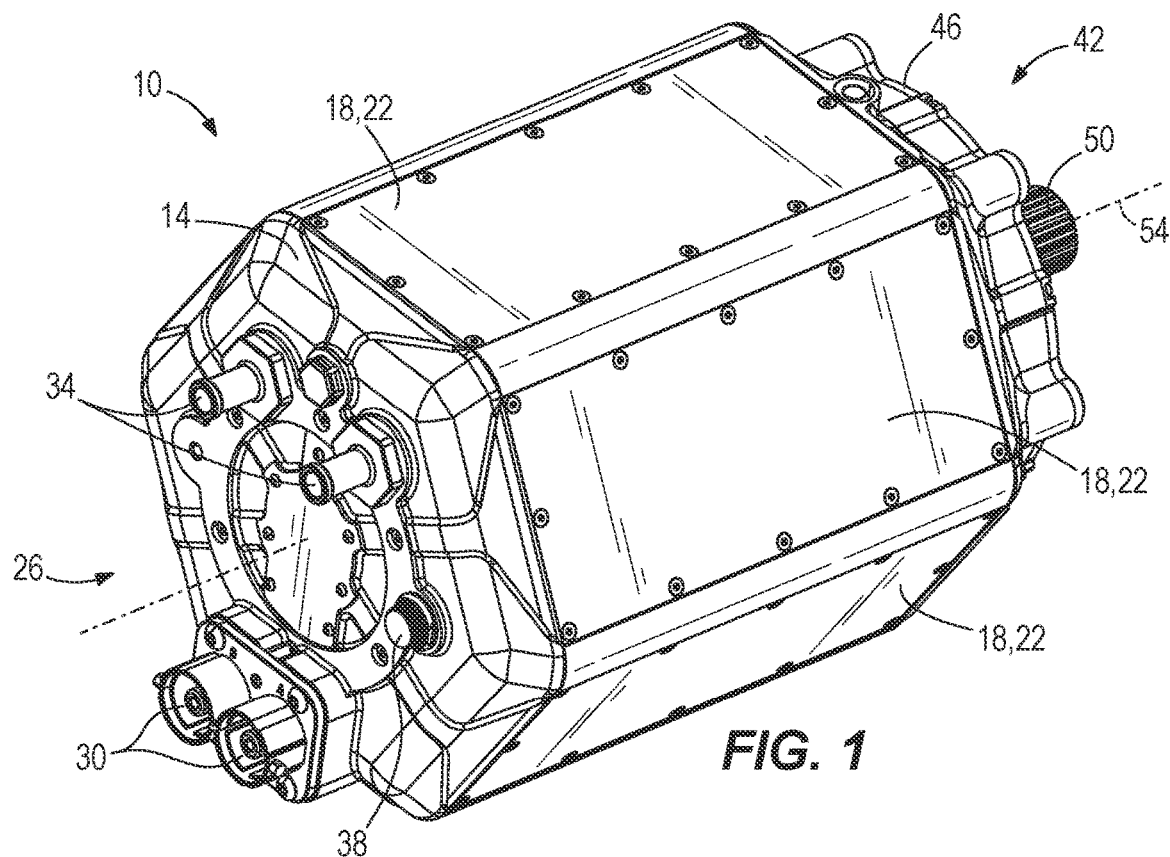
FIG. 1 is a perspective view of an integrated motor drive.

Before any embodiments are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of the present disclosure. All publications, patent applications, patents and other references mentioned herein are incorporated by reference in their entirety. The materials, methods, and examples disclosed herein are illustrative only and not intended to be limiting.

For the purposes of promoting an understanding of the principles of the present disclosure, reference will now be made to preferred embodiments and specific language will be used to describe the same. It will nevertheless be understood that no limitation of the scope of the disclosure is thereby intended, such alteration and further modifications of the disclosure as illustrated herein, being contemplated as would normally occur to one skilled in the art to which the disclosure relates.

Articles "a" and "an" are used herein to refer to one or to more than one (i.e., at least one) of the grammatical object of the article. By way of example, "an element" means at least one element and can include more than one element.

"About" and "approximately" are used to provide flexibility to a numerical range endpoint by providing that a given value may be "slightly above" or "slightly below" the endpoint without affecting the desired result.

The use herein of the terms "including," "comprising," or "having," and variations thereof, is meant to encompass the elements listed thereafter and equivalents thereof as well as additional elements. As used herein, "and/or" refers to and encompasses any and all possible combinations of one or more of the associated listed items, as well as the lack of combinations when interpreted in the alternative ("or").

Moreover, the present disclosure also contemplates that in some embodiments, any feature or combination of features set forth herein can be excluded or omitted. To illustrate, if the specification states that an apparatus comprises components A, B, and C, it is specifically intended that any of A, B or C, or a combination thereof, can be omitted and disclaimed singularly or in any combination.

Recitation of ranges of values herein are merely intended to serve as a shorthand method of referring individually to each separate value falling within the range, unless otherwise indicated herein, and each separate value is incorporated into the specification as if it were individually recited herein. For example, if a concentration range is stated as 1% to 50%, it is intended that values such as 2% to 40%, 10% to 30%, or 1% to 3%, etc., are expressly enumerated in this specification. These are only examples of what is specifically intended, and all possible combinations of numerical values between and including the lowest value and the highest value enumerated are to be considered to be expressly stated in this disclosure.

The term "mechanically coupled" or "coupled" as used herein refers to components in direct or indirect physical contact. Components that are coupled to each other need not be in continuous connection with each other, unless expressly specified otherwise. Components that are coupled to each other may be connected directly or indirectly through one or more connection means or intermediaries. "Electrically coupled" as used herein similarly refers to components directly or indirectly electrically connected.

An "integrated motor drive" as used herein refers to the combination of an electric motor and a power electronics drive (e.g., an inverter) positioned within a common housing. A "electric motor" as used herein refers to an electromagnetic motor that may operate either as a motor or a generator. The electric motor may also include supporting electronics (e.g., an inverter, a DC bus, a DC capacitor, etc.).

Unless otherwise defined, all technical terms used herein have the same meaning as commonly understood by one of ordinary skill in the art to which this disclosure belongs.

The present disclosure related to electric motor, and in particular electric motors used in electric propulsion systems. For example, the present disclosure provides a brushless permanent magnet AC integrated motor driver with synergistic techniques and improved power to weight characteristics.

Figure 2:
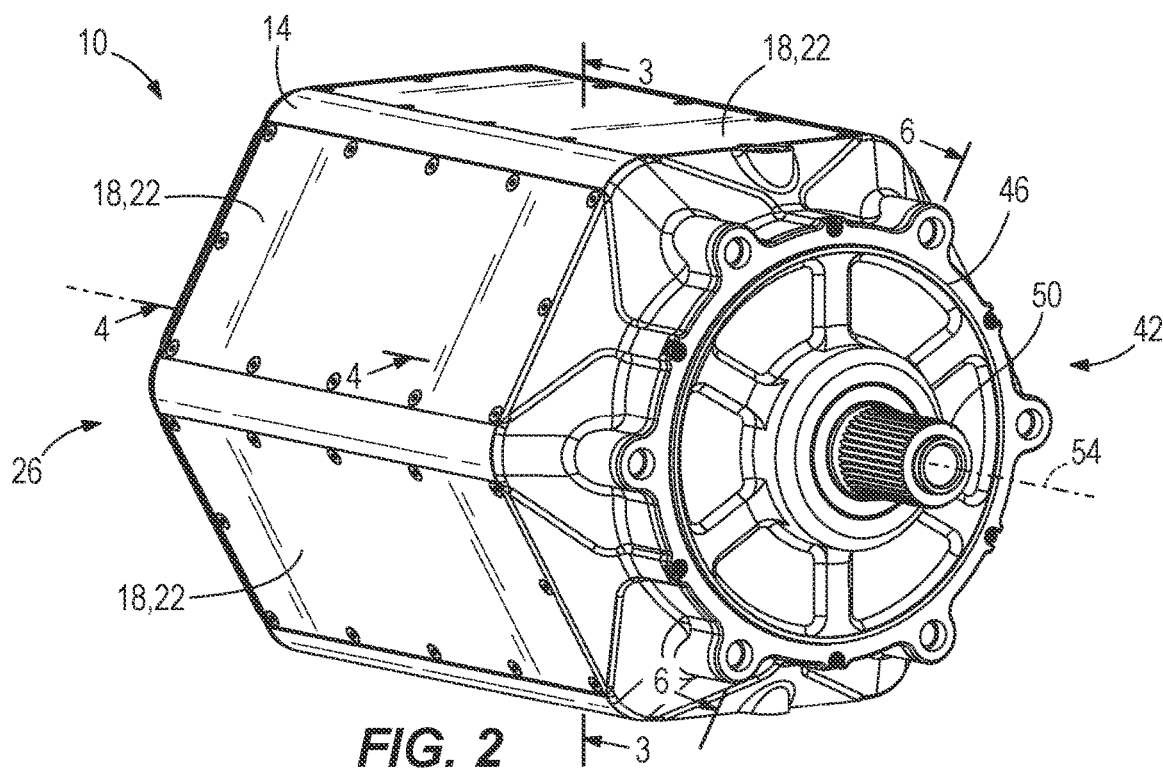
FIG. 2 is another perspective view of the integrated motor drive of FIG. 1.

With reference to FIGS. 1 and 2, an integrated motor drive 10 is illustrated with an outer housing 14. In the illustrated embodiment, the outer housing 14 is hexagonal with six planar surfaces 18. In other embodiments, the outer housing 14 is any suitable shape. In some embodiments, the outer housing 14 includes carbon fiber plates 22 that at least partially define the planar surfaces 18 to reduce mass, reduce complexity, and increase manufacturability. The integrated motor drive 10 includes a first end 26 with voltage connections 30 (e.g., a high-voltage connection), coolant connections 34 (e.g., coolant fittings), and a secondary voltage connection 38 (e.g., a low-voltage connection). The integrated motor drive 10 further includes a second end 42 with a transmission 46 and an output shaft 50 extending along an axis 54. In some embodiments, the output shaft 50 is configured to drive a propeller in an aircraft or a wheel of vehicle. In the illustrated embodiment, the axis 54 is the longitudinal axis of the integrated motor drive 10.

Figure 3:
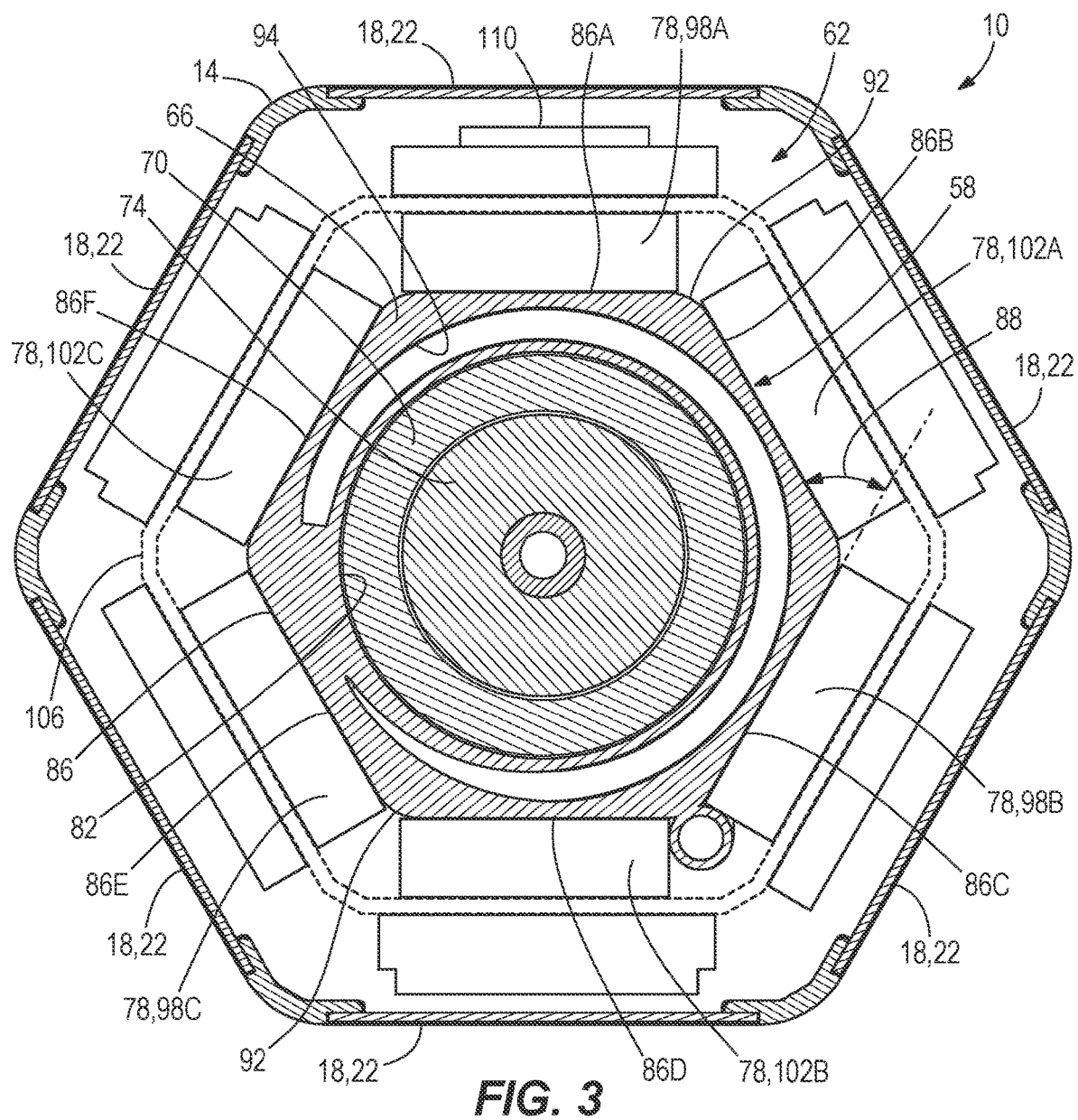
FIG. 3 is a cross-sectional view of the integrated motor drive of FIG. 1.

With reference to FIG. 3, the integrated motor drive 10 includes an electric motor 58 and a drive 62 (e.g., an inverter) positioned within the outer housing 14. The electric motor 58 includes an inner housing 66, a stator 70, and a rotor 74 positioned within the outer housing 14. In the illustrated embodiment, the rotor 74 is positioned within the stator 70. The drive 62 includes a plurality of electrical components 78 (e.g., power electronics, capacitors, switches, inverter bridge, etc.) positioned within the outer housing 14. The inner housing 66 includes an inner surface 82 and an outer surface 86 position radially outward from the inner surface 82. As explained in further detail herein, the stator 70 is mechanically and thermally coupled to the inner surface 82 and the drive 62 is mechanically and thermally coupled to the outer surface 86.

In the illustrated embodiment, the outer surface 86 of the inner housing 66 is hexagonal with six planar outer surfaces 86A-86F. The first outer surface 86A and the second outer surface 86B are oriented to intersect at an angle 88. In the illustrated embodiment, the angle 88 is approximately 60 degrees. In other embodiments, the outer surface 86 of the inner housing 66 includes 6 N number of outer surfaces, where N is a positive integer (e.g., 1, 2, 3, 4, etc.). Likewise, the angle 88 formed between the first outer surface 86A and the second outer surface 86B is approximately 360 degrees divided by 6 N, where N is a positive integer. For example, in some embodiments, the inner housing 66 has twelve outer surfaces, and the angle is between adjacent outer surfaces is approximately 30 degrees (i.e., N=2). In some embodiments, corners 92 are positioned between adjacent planar outer surface (e.g., 86A and 86B), and the corners 92 provide additional material to advantageously facilitate positioning of tapped holes, for example, to attach power electronics and capacitors.

Figure 4:
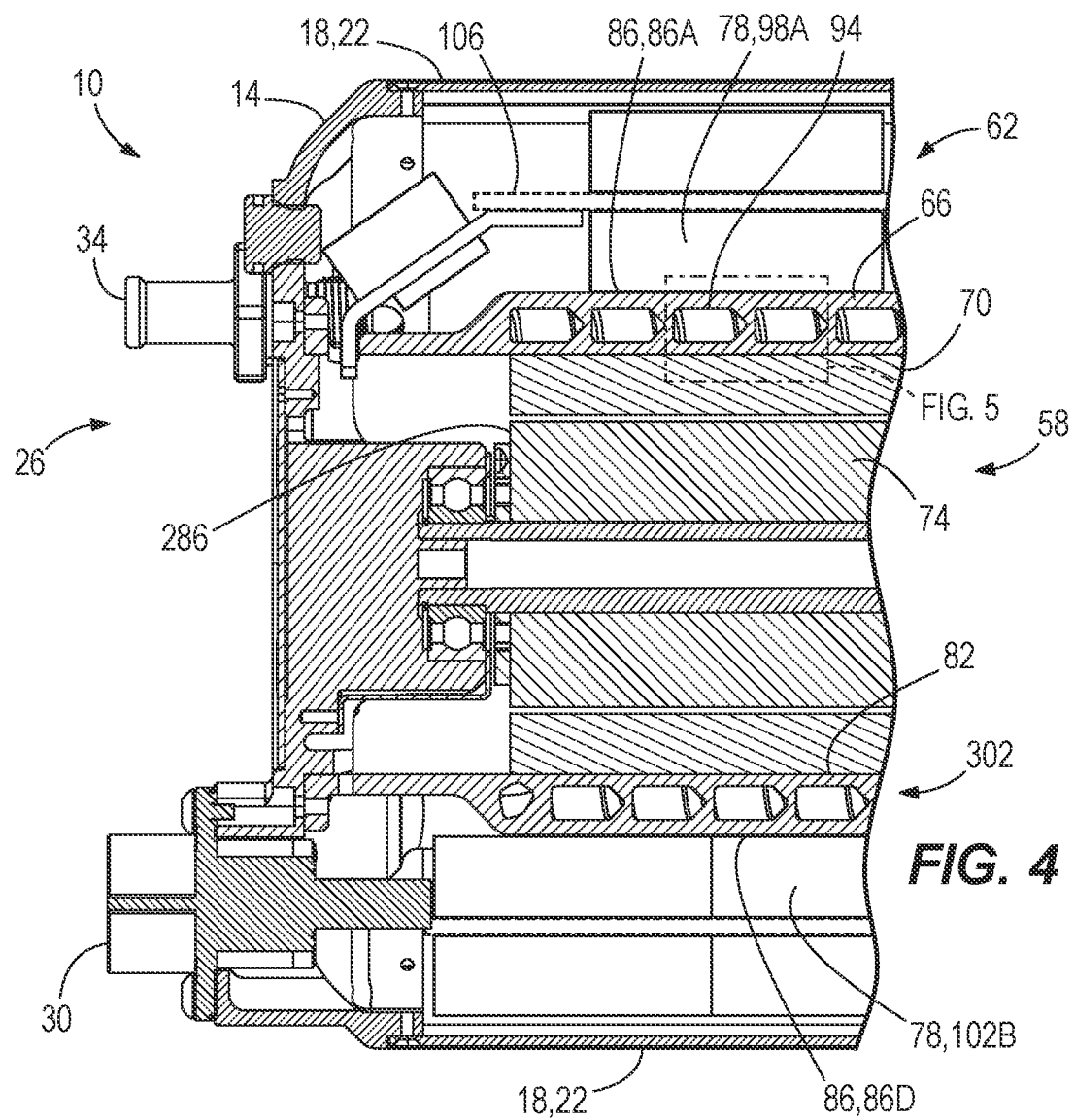
FIG. 4 is a partial cross-sectional view of the integrated motor drive of FIG. 1.

With reference to FIG. 4, the inner housing 66 includes a cooling channel 94 positioned between the inner surface 82 and the outer surface 86. In some embodiments, the cooling channel 94 is positioned between the inner surface 82 and each of the outer surfaces 86A-86F. As explained in greater detail herein, the cooling channel 94 is thermally coupled to the stator 70 at the inner surface 82 and the plurality of electrical components 78 at the outer surface 86. As such, the cooling channel 94 efficiently removes heat from a radially inward surface (i.e., the inner surface 82) and a radially outward surface (i.e., the outer surface 86). As explained in greater detail herein, the inner housing 66 is additively manufactured (i.e., 3D printed) with the cooling channel 94 formed therein. In other words, the inner housing 66 is a single unitary component that includes an internal cooling channel 94 that advantageously simultaneously cools the electric motor 58 and the drive 62. Other advantages of the inner housing 66 being additively manufactured as a single piece include: minimal wall thicknesses that lower the overall weight (i.e., wall thicknesses and geometry that may not be producible via other manufacturing techniques); and no need for large seals or O-rings because the coolant channels are completely sealed as-printed (with the exception of the inlet and outlet ports).

With continued reference to FIGS. 3 and 4, the drive 62 is thermally coupled to the outer surface 86 of the inner housing 66. In particular, the drive 62 includes the plurality of electrical components 78 with power modules (e.g., inverter branches 98A-98C) and capacitors 102A-102C (e.g., DC link capacitors). In the illustrated embodiment, a first inverter branch 98A (i.e., inverter leg) is coupled to the first outer surface 86A, a second inverter branch 98B is coupled to the third outer surface 86C, and a third inverter branch 98C is coupled to the fifth outer surface 86E. In the illustrated embodiment, a first capacitor 102A is coupled to the second outer surface 86B, a second capacitor 102B is coupled to the fourth outer surface 86D, and a third capacitor 102C is coupled to the sixth outer surface 86F. In other words, the inverter branches 98A-98C and the capacitors 102A-102C are mounted in an alternating manner circumferentially around the outer surface 86. With continued reference to FIG. 3, the drive 62 includes an electrical connection 106 (e.g., a busbar) positioned between the capacitors 102A-102C and the inverter branches 98A-98C. In some embodiments, the electrical connection 106 is a combination of overlapping copper busbars. In other embodiments, the electrical connection 106 is a combination of overlapping aluminum busbars.

In some embodiments, the inverter branches 98A-98C are wide bandgap (WBG) silicon carbide half bridge power modules. In some embodiments, the inverter branches 98A-98C switch at a rate of at least 20 kHz. In some embodiments, the inverter branches 98A-98C switch at a rate within a range of approximately 20 kHz to 80 kHz. In some embodiments, the inverter branches 98A-98C switch at a rate of approximately 50 kHz. High switching frequencies enables higher motor efficiency and the possibility of driving low inductance windings. The inverter branches 98A-98C have a high-power density footprint and a low internal inductance and a low inductance terminal structure. In some embodiments, the footprint of each inverter branches 98A-98C is approximately 80 mm by approximately 50 mm. In some embodiments, the inverter branches 98A-98C include isolated integrated temperature sensing. In some embodiments, the inverter branches 98A-98C include a silicon nitride insulator that provides robust electrical isolation with low thermal resistance and a copper baseplate for excellent thermal conductivity. In some embodiments, the inverter branches 98A-98C include Gallium Nitride or any other suitable wide-bandgap semiconductor material. In some embodiments, the drive 62 is a multi-level inverter and/or a current source inverter.

In some embodiments, the capacitors 102A-102C are DC link film capacitors potted in a plastic housing with an aluminum baseplate. In some embodiments, the baseplate improves heat transfer between the film and the cooled inner housing 66. In some embodiments, the capacitors 102A-102C and electrical connection 106 provide a low inductance, high current terminations. The capacitors 102A-102C are positioned circumferentially around the inner housing 66 such that there is one capacitor positioned near each power module (i.e., the inverter branches 98A-98C). The capacitors 102A-102C stiffen the DC bus and supply AC ripple current to the power stage.

In some embodiments, the motor drive 62 also includes low voltage electronics positioned between the outer housing 14 and the inner housing 66. Low voltage electronics include in some embodiments, a microcontroller unit 110 configured to control the motor 58 with, for example, a space vector modulation-based field-oriented control. In other embodiments, the motor control system is stator-field oriented control, direct torque control, or any other suitable motor control technique and the modulation scheme is space vector modulation (SVM), discontinuous PWM (DPWM), or any other suitable modulation scheme. In some embodiments, the microcontroller unit 110 includes a CAN communication interface.

Figure 5:
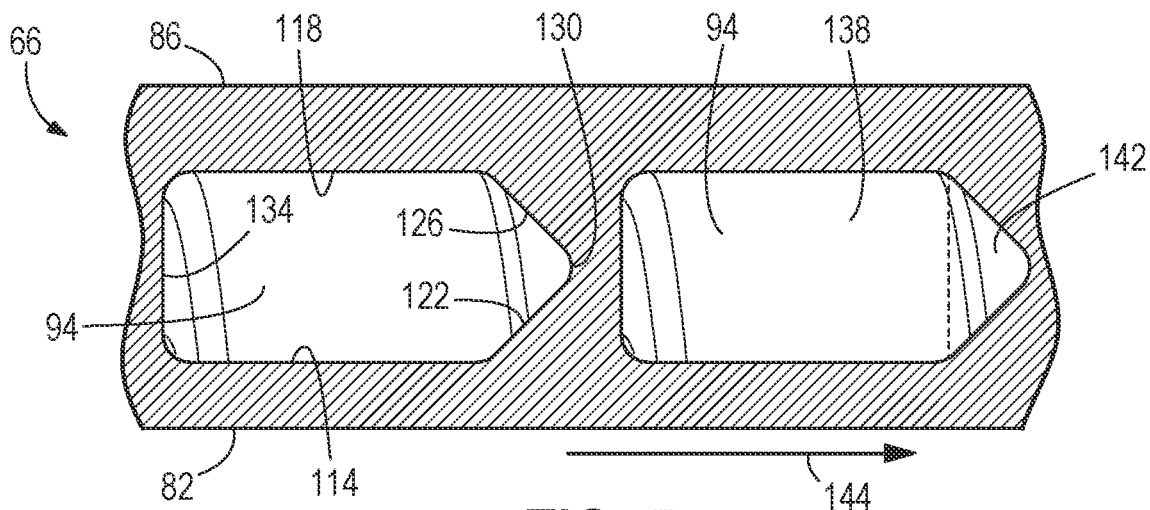
FIG. 5 is an enlarged partial view of FIG. 4.

With reference to FIG. 5, the cooling channel 94 includes a radially inward cooling surface 114 and a radially outward cooling surface 118. In the illustrated embodiment, the radially inward cooling surface 114 and the radially outward cooling surface 118 are approximately parallel. In other embodiments, the cooling surfaces 114, 118 are non-parallel. In the illustrated embodiment, the cooling channel 94 includes a first side surface 122 extending from the radially inward cooling surface 114. The first side surface 122 is non-orthogonal to the radially inward cooling surface 114. In the illustrated embodiment, the cooling channel 94 includes a second side surface 126 extending from the radially outward cooling surface 118. The second side surface 126 is non-orthogonal to the radially outward cooling surface 118. In the illustrated embodiment, the first side surface 122 and the second side surface 126 intersect at a point 130.

With continued reference to FIG. 5, in the illustrated embodiment, the cooling channel 94 also includes a third side surface 134 positioned opposite the first side surface 122 and the second side surface 126. In the illustrated embodiment, the third side surface 134 is approximately orthogonal to the radially inward cooling surface 114 and the radially outward cooling surface 118. In other embodiments, the third side surface 134 is non-orthogonal to the radially inward cooling surface 114 and the radially outward cooling surface 118. In the illustrated embodiment, the cooling channel 94 is "house shaped" with a rectangular portion 138 and a triangular portion 142. The shape of the cooling channel 94 permits heat transfer radially both inwards and outwards, simultaneously cooling the drive 62 and the motor 58.

As described in further detail herein, the cooling channel 94 is shaped to be self-supporting during an additive manufacturing process (e.g., method 186, FIG. 17) of forming the inner housing 66. The cooling channel 94 is additively manufactured in a printing direction 144. In other embodiments, the cooling channel 94 is any other suitable shape (e.g., diamond shaped, circle shaped, oval shaped, triangle shaped, polygon shaped, etc.) for self-supporting without any external supports needed during an additive manufacturing process. As used herein "self-supporting" is any shape that is additively manufacturable without the need for a support structure to retain part stiffness during manufacture. For example, a rectangular channel oriented along a printing direction is not self-supporting because the parallel ends of a rectangular channel are not printable without an additional support. In the illustrated embodiment, additive manufacturing is used to form the inner housing 66 layer-by-layer along the axis 54 in the printing direction 144, forming the cooling channel 94 without an internal support because the cooling channel 94 geometry is self-supporting.

Figure 7:
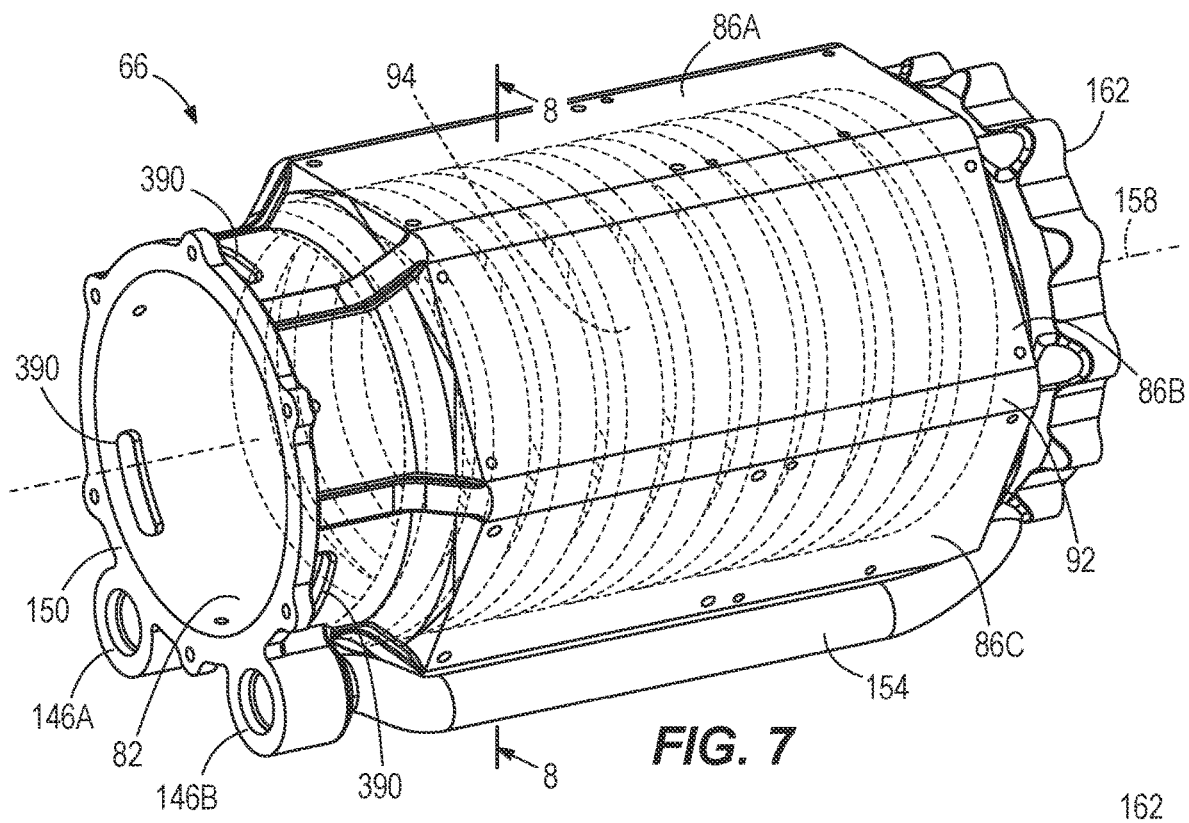
FIG. 7 is a perspective view of an inner housing of the integrated motor drive of FIG. 1.
Figure 8:
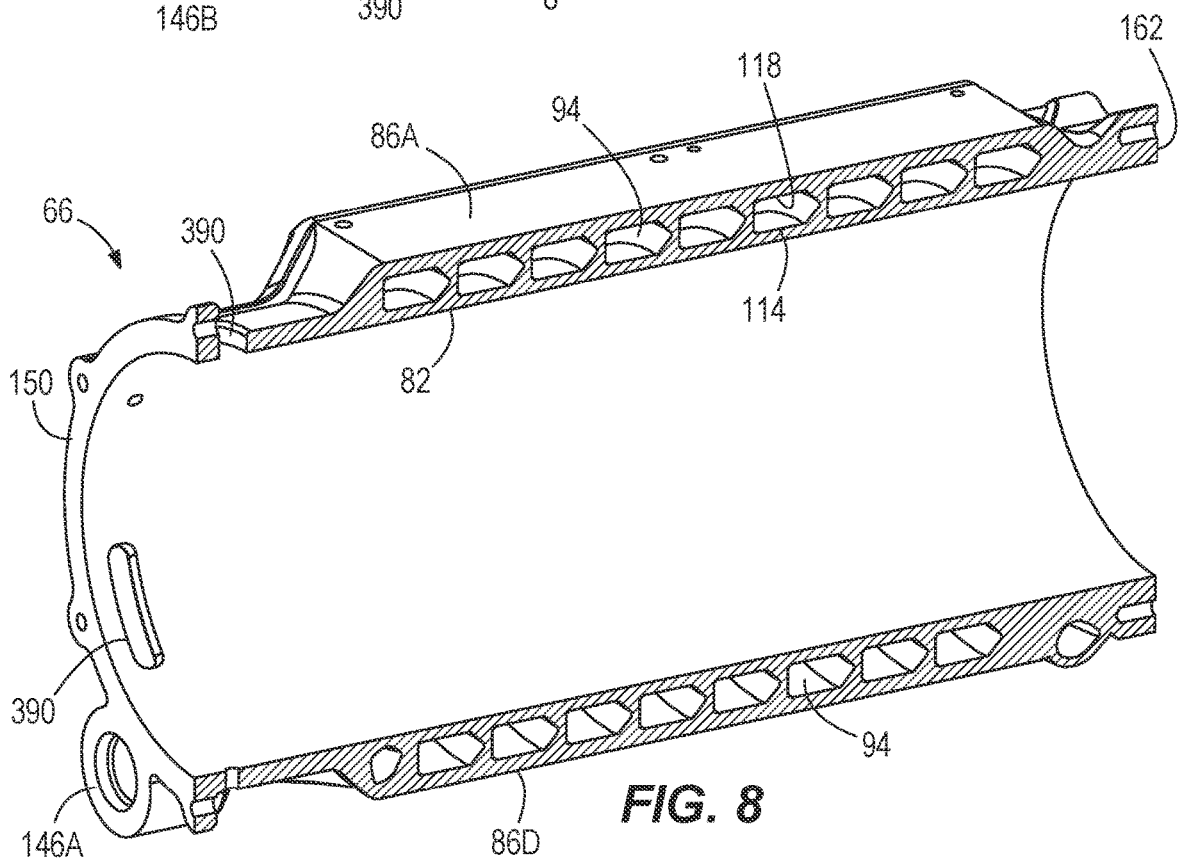
FIG. 8 is a perspective cross-sectional view of the inner housing of FIG. 7.

With reference to FIGS. 7 and 8, the cooling channel 94 is fluidly coupled to a coolant inlet 146A and a coolant outlet 146B formed at a first axial end face 150 in the inner housing 66. In the illustrated embodiment, the coolant fittings 34 are threaded into the coolant inlet 146A and the coolant outlet 146B. In the illustrated embodiment, a passageway 154 fluidly couples the cooling channel 94 to the coolant outlet 146B. In the illustrated embodiment, the cooling channel 94 helically extends along a longitudinal axis 158 of the inner housing 66. In other words, the cooling channel 94 is a helical spiral. In some embodiments, a coolant (e.g. a liquid coolant) is configured to flow through the coolant inlet 146A, the cooling channel 94, the passageway 154, and out the coolant outlet 146B—forming a cooling circuit. In the illustrated embodiment, the cold coolant enters the cooling channel 94 and increases in temperature as it travels through the helix before being transported out through the passageway 150. In other embodiments, the flow of coolant is reversed. The coolant circulates through the inner housing 66 and serves as a common cooling medium for both the electric components 78 at the outer surface 86, and the stator 70 at the inner surface 82. In other embodiments, the coolant channel 94 is not a helical spiral, but includes multiple parallel channels that split from a common inlet and merge to a common outlet.

Advantageously, the inner housing 66 provides a common cooling structure (i.e., the cooling channel 94) used for cooling both the stator 70 and the rotor 74 positioned within the inner housing 66 as well as cooling the electrical components 78 mounted on the outer surfaces 86A-86F of the inner housing 66. In other words, the inner housing 66 provides a higher degree of mechanical and thermal integration between the drive 62 and the electric motor 58. As such, the electric motor 58 and the drive 62 are integrated into a single unit that shares a common additively manufactured thermal management system (i.e., the cooling channel 94 and the inner housing 66).

Figure 6:
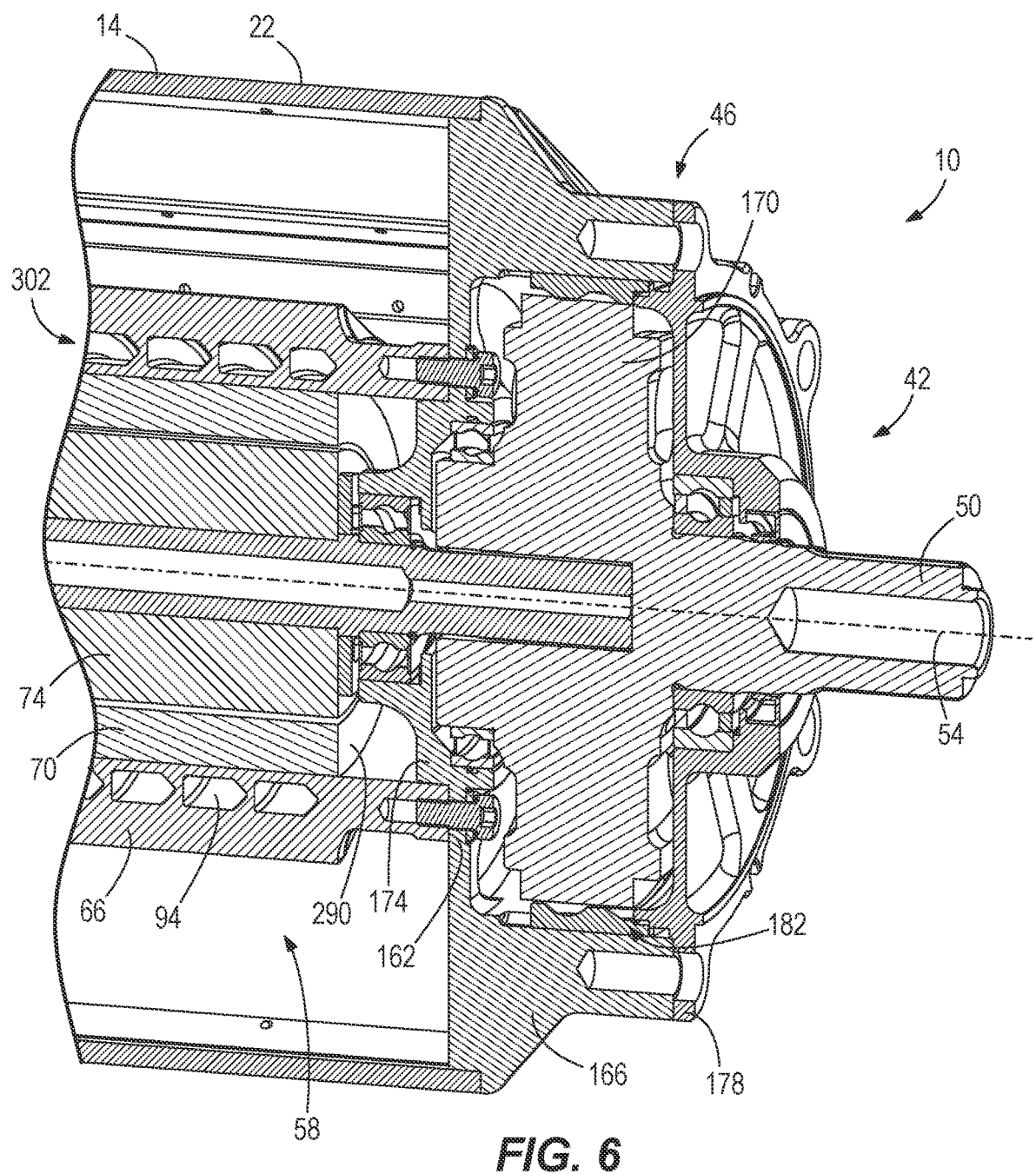
FIG. 6 is a partial perspective cross-sectional view of the integrated motor drive of FIG. 1.

With reference to FIG. 6, the inner housing 66 includes a second axial end face 162 coupled to the transmission 46. In the illustrated embodiment, the second axial end face 162 is opposite the first axial end face 150 with the axis 158 extending therebetween. In the illustrated embodiment, the transmission 46 includes a transmission case 166, a plurality of gears and/or bearings 170, and a lubricant (e.g., a lubricating oil). The transmission case 166 is thermally coupled to the second axial end face 162. In the illustrated embodiment, the transmission case 166 is abutted directly against the second axial end face 162. In addition, a portion 174 of the transmission case 166 abuts the inner surface 82 of the inner housing 66. As such, the transmission case 166 is also thermally coupled to the inner surface 82. In the illustrated embodiment, the inner housing 66 synergistically cools the electric motor 58, the transmission 46 and the drive 62.

With continued reference to FIG. 6, the transmission 46 includes a cover 178 and a cavity 182 is at least partially defined by the cover 178 and the transmission case 166. In the illustrated embodiment, the plurality of gears and/or bearings 170 and the lubricant are positioned and contained within the cavity 182. In other words, the transmission 46 is modular and is easily installed, replaced, or removed. In some embodiments, the transmission 46 includes a planetary gearbox. In some embodiments, the integrated motor drive 10 does not include a gear reduction.

Advantageously, the cooling channel 94 provides cooling of the electric motor 58, the drive 62, and the transmission 56. In other words, the cooling channel 94 provides synergistic cooling with the electric motor 58, the drive 62, and the transmission 46. Conventional designs separate the inverter and motor and have separate thermal management systems each. Such conventional separate thermal management systems create undesirable extra mass, lowering the specific power of the design.

With reference to FIGS. 7 and 8, the inner housing 66 is additively manufactured with the cooling channel 94 formed therein. The inner housing 66 is a single unitary component, and portions of the inner housing 66 (e.g., the cooling channel 94) would not be feasible to manufacture with conventional techniques (e.g., casting).

Figure 17:
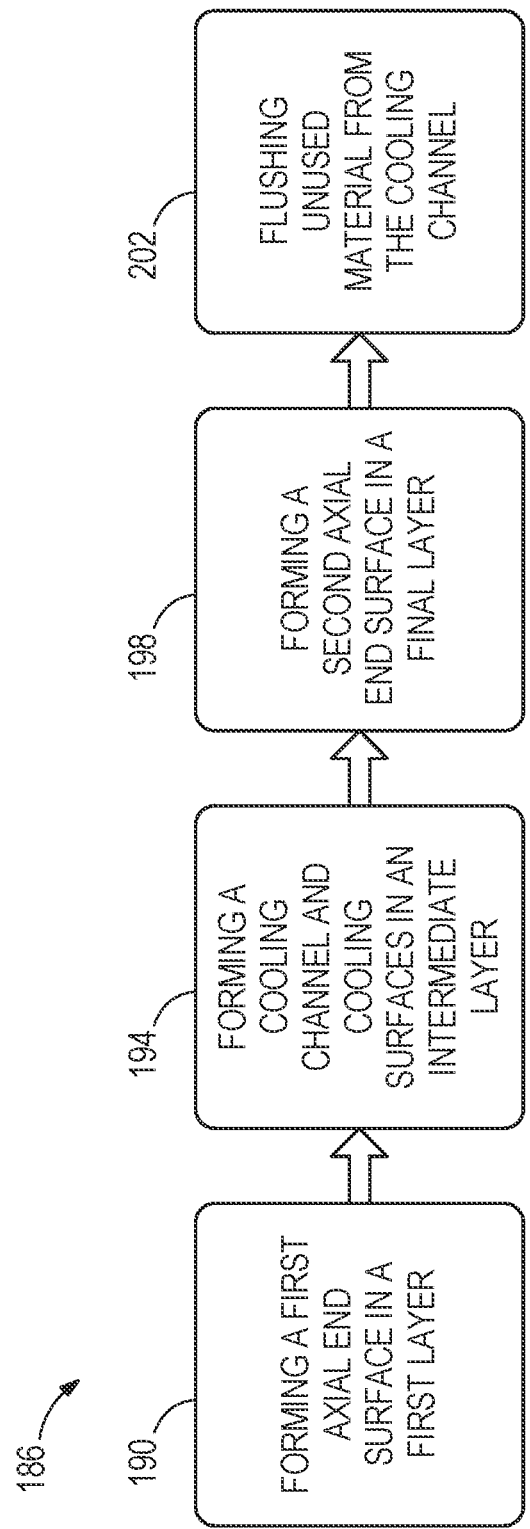
FIG. 17 is a method of additively manufacturing an electric motor housing.

With reference to FIG. 17, a method 186 of additively manufacturing an electric motor is illustrated. The method 186 includes STEP 190 of forming a first axial end surface (e.g., first axial end surface 150 of the inner housing 66) in a first layer of material. The method 186 further includes STEP 194 of forming a coolant channel, a radially inward surface, and a radially outer surface in a second, intermediate layer. As discussed herein, the cooling channel is positioned between the radially inward surface and the radially outward surface. For example, in the illustrated embodiment, the cooling channel 94, the radially inward surface 82 and the radially outer surface 86 are formed in a second, intermediate layer. As described herein, the cooling channel 94 is formed without an additional support component. In other words, the cooling channel 94 is shaped such that it is self-supporting as the cooling channel 94 is built up in the printing direction 144 along the axis 158. In the illustrated embodiment, the axis 54 and the axis 158 are the same. As such, portions of the cooling channel 94, the inward surface 82 and the outer surface 86 are all formed as part of a single layer in additive manufacture method 186.

With continued reference to FIG. 17, the method 186 further includes STEP 198 of forming a second axial end surface (i.e., the second axial end face 162) in a final layer (i.e. a third layer). In the illustrated embodiment, the second layer is positioned between the first layer and the third layer along the axis 158. In other words, the axis 158 is the printing axis along which the inner housing 66 is built up layer by layer.

In some embodiments, the method 186 further includes smoothing a surface with machining to improve the thermal contact at the surface. For example, in some embodiments, the inner surface 82 is machined to improve the thermal contact between the inner surface 82 and the stator 70. In some embodiments, the stator 70 is received within the inner housing 66 by an interference fit. In some embodiment, the outer flat surfaces 86 (e.g., 86A-86F) are machined to improve the thermal contact to the electrical components 74 (e.g., a power module, a capacitor, etc.)

With continued reference to FIG. 17, in some embodiments the method 186 further includes STEP 202 of flushing a remaining material out of the cooling channel. After the cooling channel is formed, the remaining un-solidified material (e.g., powder) is flushed from the cooling channel. In some embodiments, pressurized air is utilized to blow the remaining material out of the internal helical cooling channel. In some embodiments, STEPS 190, 194, 198 of forming the first, second, and third layers are performed with direct metal laser sintering (DMLS). In other embodiments, STEPS 190, 194, 198 of forming the first, second, and third layers are performed with binder jetting. In some embodiment, the inner housing 66 is additively manufactured with an aluminum material (e.g., AlSi10 Mg). As such, the inner housing 66 is additively manufactured from a material with a high thermal conductivity (e.g., aluminum) and the cooling channel 94 is integrally formed with the inner housing 66.

Although process or method steps may be described in sequential order, such processes and methods may generally be configured to work in alternate orders, unless specifically stated to the contrary. In other words, any sequence or order of steps that may be described here does not, in and of itself, indicate a requirement that the steps be performed in that order. The steps of the described processes may be performed in any suitable or practical order. Further, some steps may be performed simultaneously despite being described or implied as occurring non-simultaneously. The illustration of the method 186 by its depiction in a drawing does not imply that the illustrated process is exclusive of other variations and modifications thereto, does not imply that the illustrated process or any of its steps are necessary to one or more embodiments, and does not imply that the illustrated process is preferred. Also, steps are generally described once per aspect, but this does not mean they must occur once, or that they may only occur once each time a process or method is carried out. For example, some steps may be omitted in some embodiments, and/or some steps may be executed more than once in a given occurrence.

As described herein, the drive 62 and the electric motor 58 are integrated into a single unit and use a shared thermal management system that is made using additive manufacturing. In the illustrated embodiment, the inner housing 66 has a hexagonal outer profile (i.e., outer surface 86) to which electrical components 78 are mounted and a circular inner surface (82) into which the stator 70 is inserted. The inner housing 66 includes the internal cooling channel 94 with a "house-shaped" geometry that permits heat transfer both radially inward and radially outwards to simultaneously cool the drive 62 and the electric motor 58. Advantageously, the cooling channel 94 is shaped to provide a large surface area for convection cooling. The cooling channel 94 a self-supporting shape and is additively manufactured with no support component.

In other embodiments, the internal housing 66 is additively manufactured into any suitable shape. In other embodiments, the inner housing is built up to have cavities so that the inverter components are installed inside these cavities, perhaps with the cooling channel between the cavities and the stator, or perhaps with more than one cooling channel such as an inner cooling channel and an outer cooling channel. The inverter components could also be mounted with some components mounted in such internal cavities and some mounted on the outside surface.

Figure 9:
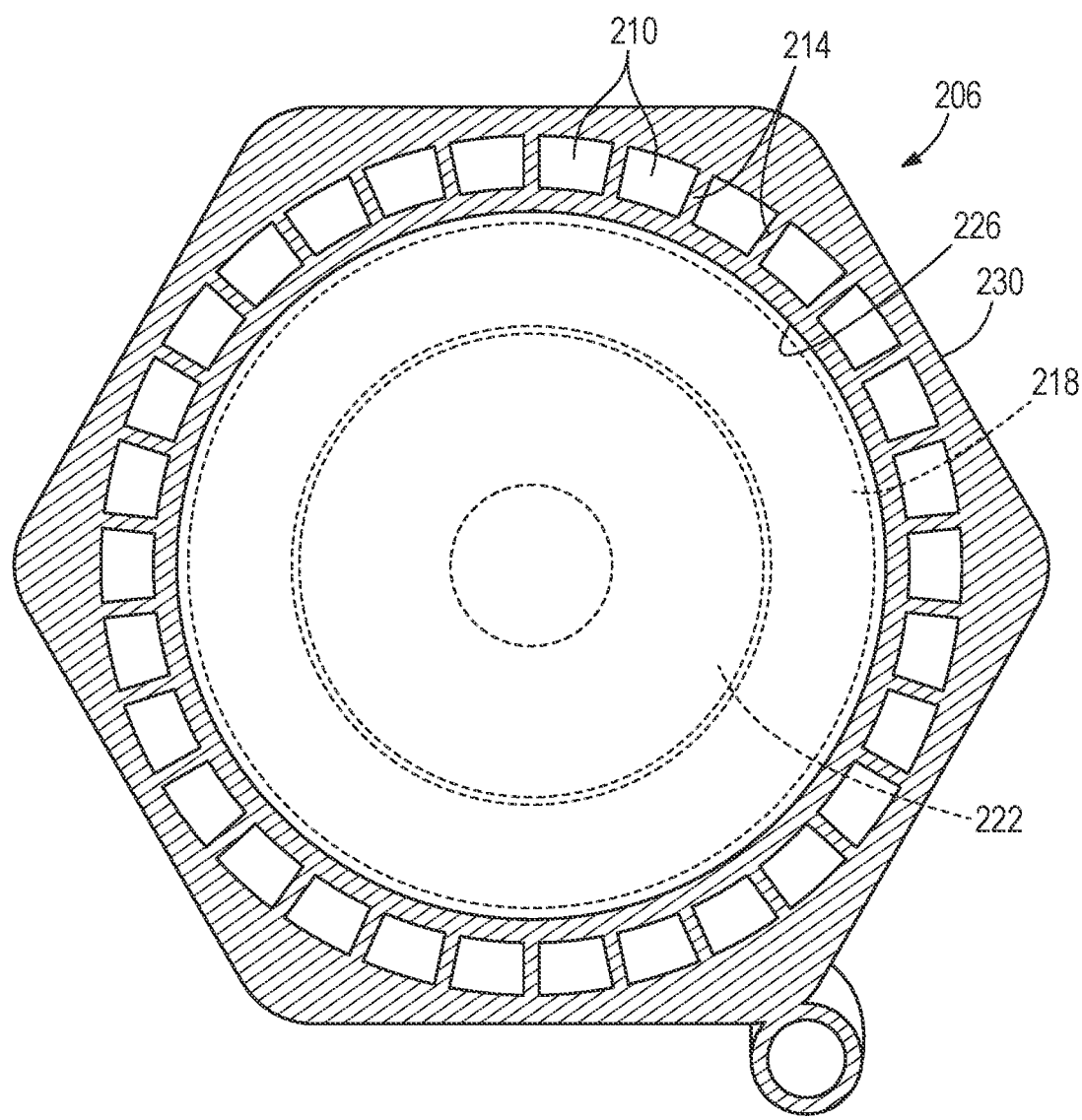
FIG. 9 is a cross-sectional view of the inner housing according to one aspect of the disclosure.

With reference to FIG. 9, in some embodiments an inner housing 206 is additively manufactured to include a plurality of cooling channels 210 formed between radially extending fins 214. For example, the cooling channel 210A is formed between a first radially extending fin 214A and a second radially extending fin 214B. In some embodiments, an airflow is configured to flow through the plurality of cooling channels 210. As such, the integrated motor drive described herein can be air cooled and/or liquid cooled. The inner housing 206 receives a stator 218 and a rotor 222 within an inner surface 226 (similar to the inner surface 82), and an outer surface 230 is configured to receive electrical components of a drive (similar to the outer surface 86). Thus, in view of such possible variations descried herein, it should be clear that the present disclosure provides an inner housing additively manufactured as a structure that is designed to integrate the inverter function and the stator function by physically supporting both these while also providing a common cooling function for both. In some embodiments, the cooling fins are wave-shaped, lattice-shaped, or any other suitable shape.

Figure 10:
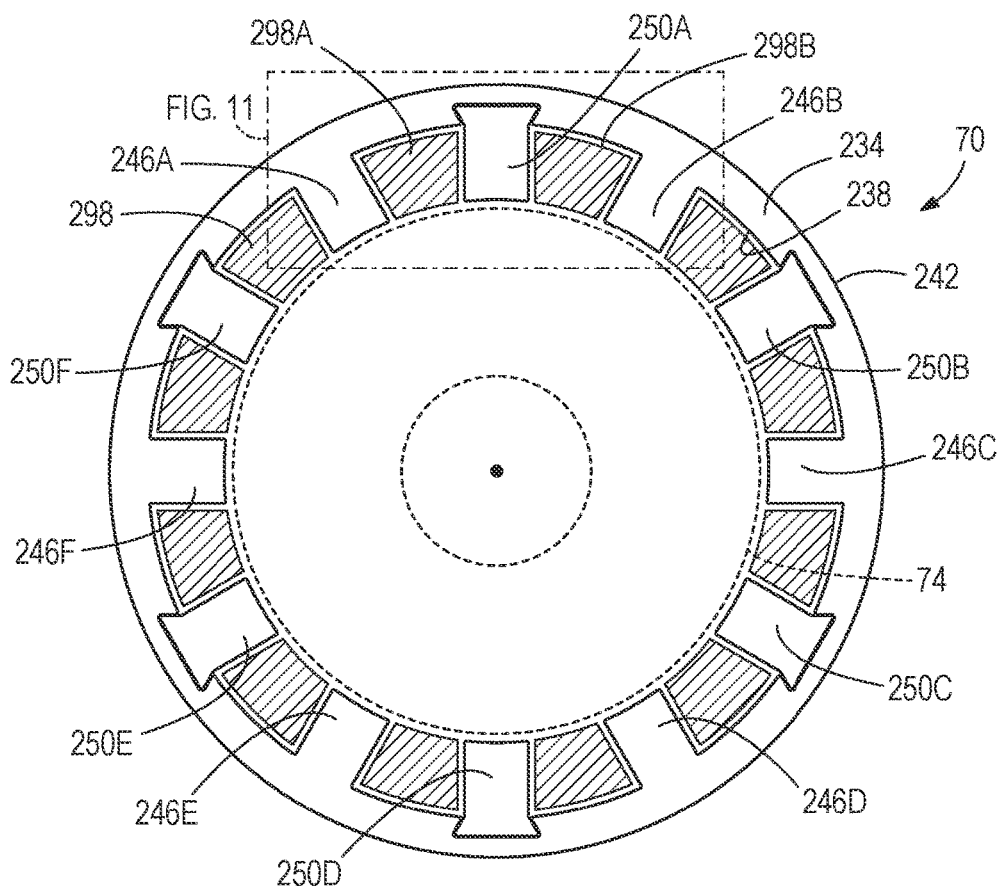
FIG. 10 is a cross-sectional view of a stator of the integrated motor drive of FIG. 1.
Figure 11:
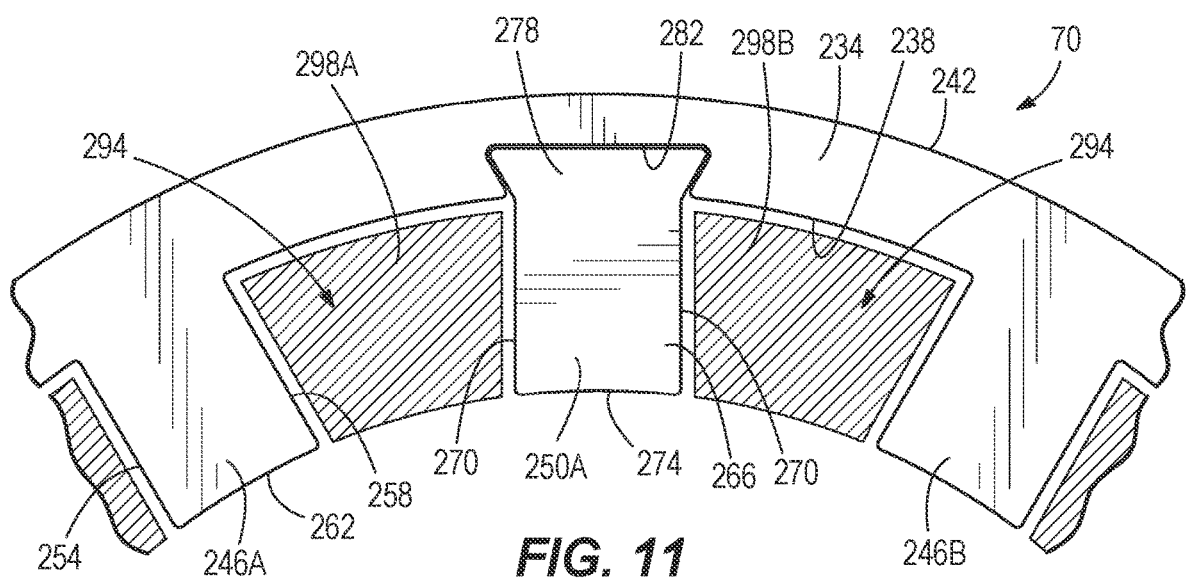
FIG. 11 is an enlarged partial view of FIG. 10.

With reference to FIGS. 10 and 11, the stator 70 of the electric motor 58 includes a yoke 234 (i.e., a back iron portion) with an inner surface 238 and an outer surface 242, a plurality of integral teeth 246, and a plurality of segmented teeth 230. In some embodiments, the yoke 234 is manufactured from stacked thin electrical steel laminations.

In the illustrated embodiment, the plurality of integral teeth 246 alternate with the plurality of segmented teeth 250 circumferentially around the yoke 234. For example, a first integral tooth 246A extends radially inward from the yoke 234 and the second integral tooth 246B extends radially inward from the yoke 234. Likewise, a first segmented tooth 250A extends radially inward from the yoke 234, and the first segmented tooth 250A is positioned circumferentially between the first integral tooth 246A and the second integral tooth 246B. A second segmented tooth 250B also extends radially inward from the yoke 234, and the second integral tooth 246B is positioned circumferentially between the first segmented tooth 250A and the second segmented tooth 250B. Unlike conventional fully segmented stators, the stator 70 described herein includes alternating integral teeth 246 and segmented teeth 250.

With reference to FIG. 11, the first integral tooth 246A includes a first side surface 254, a second side surface 258, and a radially inward surface 262 that extends between the first side surface 254 and the second side surface 258. In the illustrated embodiment, the first side surface 254 and the second side surface 258 extend radially inward from the inner surface 238 of the yoke 234 to the radially inward surface 262. In some embodiments, the first side surface 254 and the second side surface 258 are parallel. In the illustrated embodiment, the radially inward surface 262 on the first integral tooth 246A is arcuate. In other words, the radially inward surface 262 is curved corresponding to the curvature of the rotor 74. In some embodiments, the second integral tooth 246B and the other integral teeth 246 are structurally identical to the first integral tooth 246A.

With continued reference to FIG. 11, the first segmented tooth 250A includes an extending portion 266 that extends from the inner surface 238 of the yoke 234. The extending portion 266 includes side surfaces 270 and a radially inward surface 274 extending between the side surfaces 270. In the illustrated embodiment, the radially inward surface 274 is arcuate and the side surfaces 270 are parallel. In some embodiment, the first segmented tooth 250A includes a connection portion 278 that is received within a corresponding slot 282 formed in the yoke 234. In the illustrated embodiment, the connection portion 278 is dovetail shaped. In other words, the dovetail connection portion 278 of the segmented tooth 250A is received within a corresponding slot 282 formed in the yoke 234. In other embodiments, the connection portion 278 is any suitable mechanical interface (e.g., rail and slot). In other embodiments, the segmented tooth 250A includes no connection portion but rather abuts directly against the inner surface 238 of the yoke 234. In some embodiments, the second segmented tooth 250B and the other segmented teeth 250 are structurally identical to the first segmented tooth 250A.

In some embodiments, each of the segmented teeth 250 is further segmented into more than one axial segments. In some embodiments, the segmented tooth 250A includes a first axial segment and a second axial segment. The yoke 234 includes a first axial end face 286 (FIG. 5) and a second axial end face 290 (FIG. 6) and each of the segmented teeth 250 have an axial length that extends from the first axial end face 286 to the second axial end face 290. Each of the segmented teeth 250 also have a radial length that extends from the inner surface 238. In some embodiments, each of the segmented teeth 250 have an aspect ratio of the longitudinal length to the radial length that is large. In some embodiments, the aspect ratio is within a range of approximately 10:1 to approximately 20:1. In some embodiments, the aspect ratio is approximately 15:1. By further axially segmenting each of the segmented teeth 250, the large aspect ratio of the segmented tooth 250 can be manufactured while maintaining tolerances and structural integrity. Likewise, laminated stator and rotor components (e.g., yoke 234, integral teeth 246, rotor 74, magnets, etc.) can be split into multiple axial segments during manufacture in addition to being laminated to reduce the aspect ratio of individual parts.

In the illustrated embodiment, a slot 294 (i.e., a winding slot) is defined between adjacent integral teeth 246 and segmented teeth 250. In some embodiments, a first stator winding 298A is wound around the first integral tooth 246A and a second stator winding 298B is wound around the second integral tooth 246B, and the first segmented tooth 250A is positioned between the first winding 298A and the second winding 298B. In some embodiments, no winding is wound around the segmented teeth 250. In other words, every other stator tooth is wound in the illustrated embodiment, with six wound teeth (i.e., the six integral teeth 246) and six un-wound teeth (i.e., the six segmented teeth 250).

Advantageously, the first winding 298A can easily be inserted onto the first integral tooth 246A after the first winding 198A is formed and while the first segmented tooth 250A is removed from the yoke 234. After the first winding 298A is inserted around the first integral tooth 246A and the second winding 298B is inserted around the second integral tooth 246B, the first segmented tooth 250A is then inserted and coupled to the yoke 234. As such, the first segmented tooth 250A acts to retain the first winding 298A and the second winding 298B in position once the segmented tooth 250A is coupled to the yoke 234. In other words, the segmented teeth 250 secure a plurality of windings 298 onto the integral teeth 246. In some embodiments, the stator 70 includes a 3-phase, 12-slot, 10-pole single layer fractional-slot concentrated winding. In some embodiments, the windings 298 are additively manufactured and configured to fill the entire corresponding slot 294. For example, in some embodiments, the stator windings 298 are additively manufactured from pure copper. In some embodiments, a thermally conductive insulating film is included in the additively manufactured stator windings 298.

With continued reference to FIG. 10, the outer surface 242 of the yoke 234 is a single continuous cylindrical surface. With reference to FIG. 3, the inner surface 82 of the inner housing 66 forms a circular bore. The stator 70 is received within the circular bore and an interference fit 302 is formed between the stator 70 and the inner housing 66. In other words, the outer surface 242 forms the interference fit 302 with the inner housing 66 when the stator 70 is inserted into the inner housing 66. The interference fit 302 and tight manufacturing tolerances results in improved concentricity of the stator 70 and the rotor 74 within the inner housing 66.

Advantageously, the stator 70 has high dimensional accuracy with the integral teeth 246, while still maintaining the benefit of retaining the windings 298 with the segmented teeth 250. Partial segmentation of the teeth in the stator 70 also minimizes stray air gaps in the magnetic circuit.

In some embodiments, once installed in the inner housing 66, the stator 70 and the windings 298 are at least partially potted with a low-viscosity thermally conductive encapsulant. In some embodiments, the stator 70 is encapsulated from the inner diameter of the stator to the outer diameter of the stator. In some embodiments, the encapsulant fully covers the end turns and phase connection bus bars but remains exclusively within the inner housing 66.

In some embodiments, the plurality of stator windings 298 is electrically coupled in a wye connection. In some embodiments, the stator windings 298 are arranged in a winding pattern of AbCaBc, where upper and lower case indicates winding current direction. In other embodiments, the plurality of stator windings 298 is electrically coupled in a delta connection. In the illustrated embodiment, two windings are electrically coupled in series for each of the three wye connection branches. In other embodiments, more than two windings are electrically coupled in series. In other embodiments, windings are coupled in parallel for each of the three wye connection branches. The illustrated configuration of the stator windings 298 exhibits low total harmonic distortion (THD) voltage waveforms at no-load and low THD line voltages under full load, which improves the controllability of the motor.

In some embodiments, the electric motor includes any number of phases, an odd numbers of pole pairs, an even numbers of coils per phase, and a single layer fractional slot concentrated winding. In some embodiments, the stator winding configuration does not include any mutual flux linkage between stator windings of different phases. Effectively, if one winding is turned on, the other windings do not "see" any of the flux, and no voltage is induced in any of the other windings as a result of current flowing in the first winding. As such, in a fault scenario, the faulty winding advantageously does not magnetically induce voltages in the other stator windings. Additionally, this means that even under extremely high loading and heavy saturation, the line voltages of the machine contain low total harmonic distortion (THD) and remain sinusoidal since the armature reaction flux from each winding does not link to any adjacent windings or induce any voltage in the adjacent windings. In some embodiments, the stator windings are connected into two independent wye connections (i.e., one winding from each phase per wye) to improve fault tolerance such that in case of a fault, the electric motor 58 can still be driven with the windings in the un-faulted wye at half power.

Figure 12:
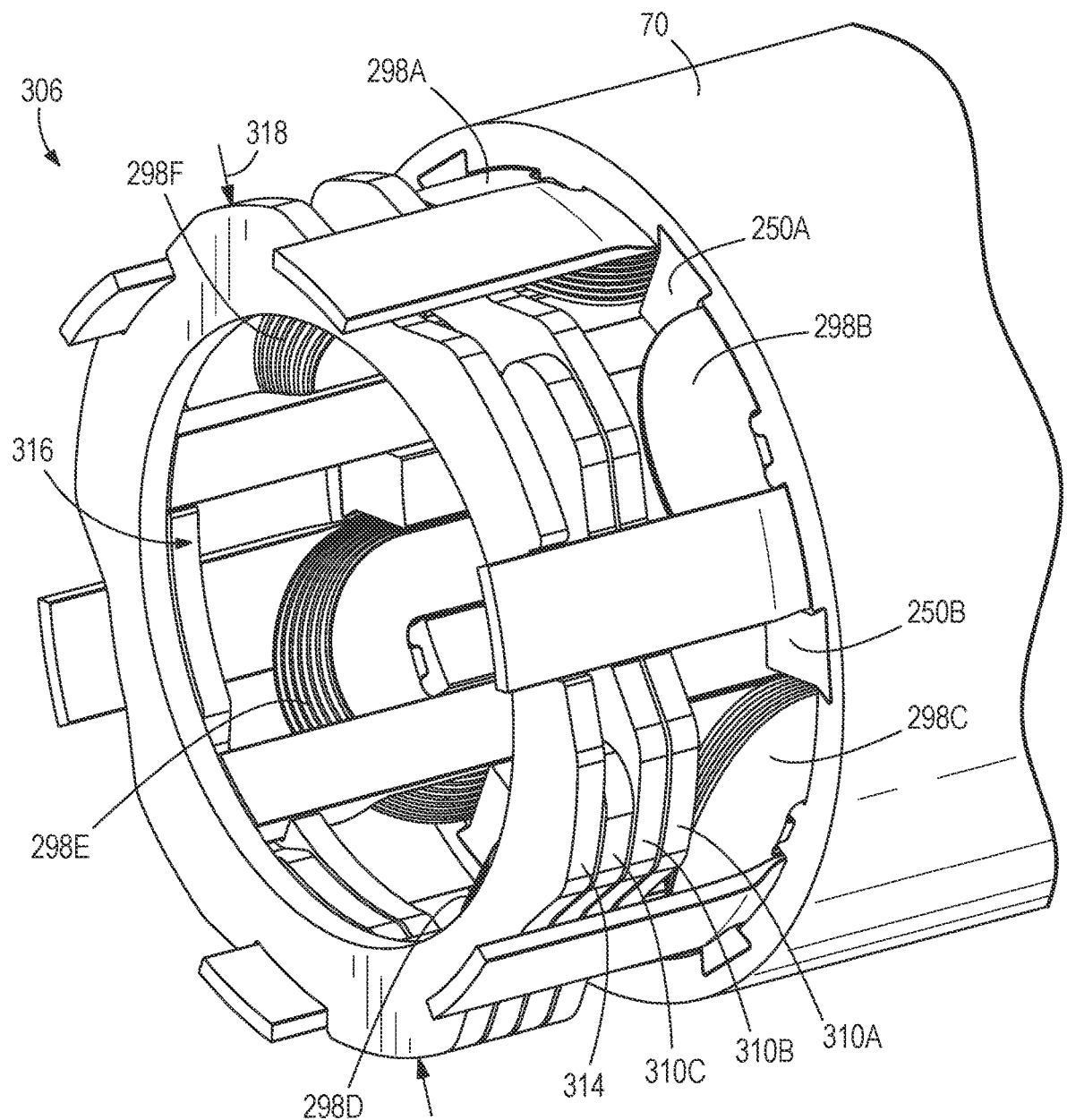
FIG. 12 is a perspective view of a bus bar assembly according to one aspect of the disclosure.
Figure 13:
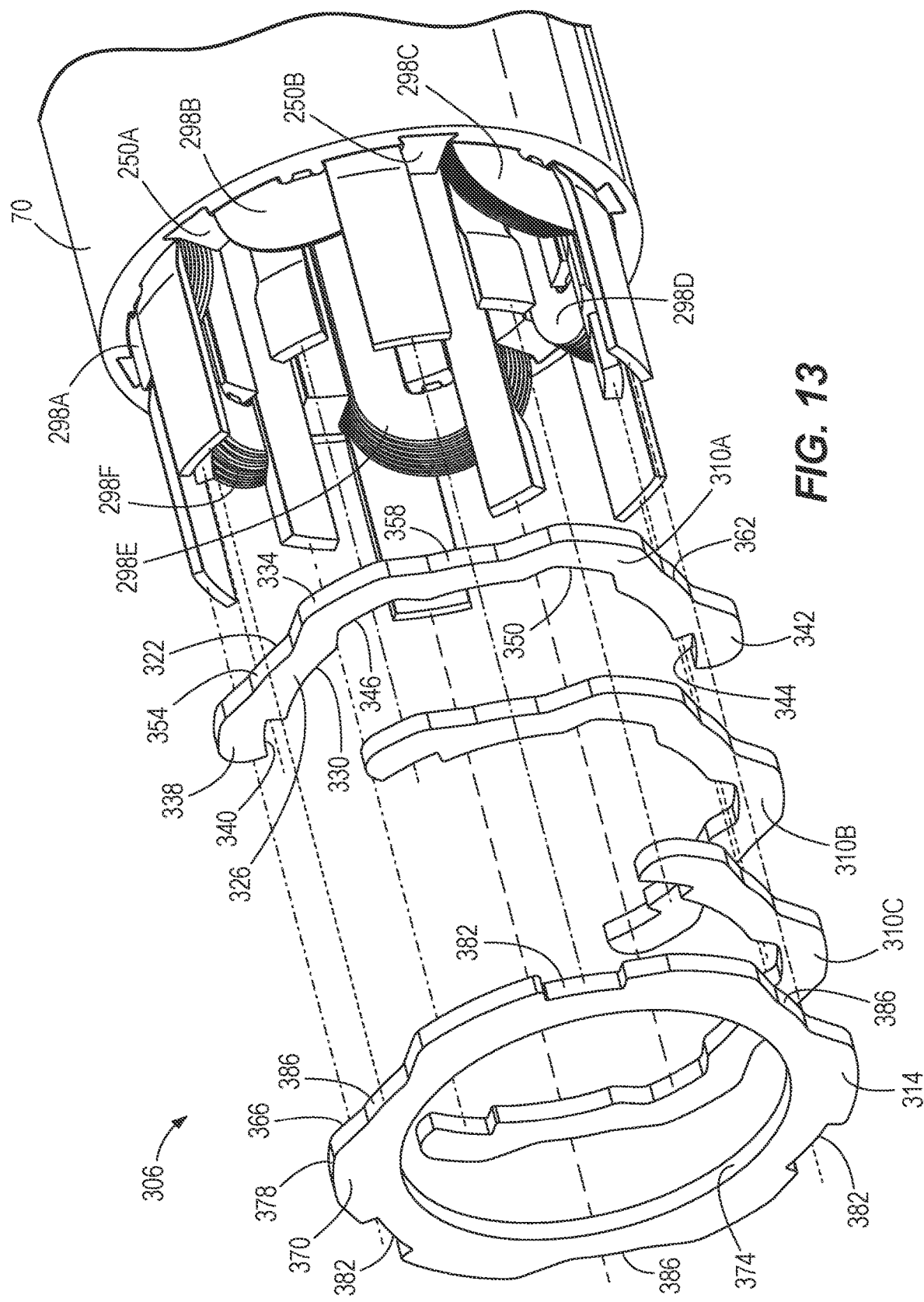
FIG. 13 is an exploded view of the bus bar assembly of FIG. 12.

With reference to FIGS. 12 and 13, in some embodiments, the electric motor 58 includes a bus bar assembly 306 electrically coupled to the plurality of stator winding 298. In the illustrated embodiment, the bus bar assembly 306 is positioned at the first axial end face 286 of the yoke 234; more specifically tangent to the coil end turn at the first axial end face 286. The bus bar assembly 306 includes a first bus bar 310A, a second bus bar 310B, a third bus bar 310C, and a neutral bus bar 314. The first bus bar 310A, the second bus bar 310B, the third bus bar 310C, and the neutral bus bar 314 form an axial stack that extends along the axis 54. In other words, the bus bars 310A-310C and 314 are positioned along the axis 54. In the illustrated embodiment, a portion of the rotor 74 (e.g., the rotor shaft) extends through a center opening 316 in the bus bar assembly 306. In other embodiments, a bearing shoulder extends through the bus bar assembly 306.

In the illustrated embodiment, the axis 54 is the longitudinal axis of the stator 70 and extends through the first axial end face 286 and the second axial end face 290. The first bus bar 310A is positioned along the axis 54 between the first axial end face 286 and the second bus bar 310B. The second bus bar 310B is positioned along the axis 54 between the first bus bar 310A and the third bus bar 310C. The third bus bar 310C is positioned along the axis 54 between the second bus bar 310B and the neutral bus bar 314. In the illustrated embodiment, an outer diameter 318 of the bus bars 310A-310C and the neutral bus bar 314 is approximately equal to an outer diameter of the stator 70.

With reference to FIG. 13, the first bus bar 310A, the second bus bar 310B, and the third bus bar 310C are identically shaped. In other words, the bus bars 310A-310C are structurally identical but oriented in different positions with respect to the stator 70. The identical bus bars 310A-301C are therefore easier and cheaper to manufacture as a common component. As such, structure described herein for the first bus bar 310A is also applicable to the second bus bar 310B and the third bus bar 310C.

With continued reference to FIG. 13, the first bus bar 310A includes a first planar surface 322, a second planar surface 326, a radially inward facing surface 330, and a radially outward facing surface 334. The first bus bar 310A includes a first terminating end 338 and an opposite second terminating end 342. One of the plurality of windings 298 is electrically coupled to the first terminating end 338 and another one of the plurality of windings 298 is electrically coupled to the second terminating end 342. In the illustrated embodiment, each terminating end 338, 342 includes a groove 340, 344, respectively, to receive a portion of a stator winding and to electrically and mechanically coupled the stator winding to the first bus bar 310A. In the illustrated embodiment, the first bus bar 310A electrically interconnects radially opposite stator windings 298. In some embodiments, the first bus bar 310A is a copper bar with a dielectric layer.

In the illustrated embodiment, the first bus bar 310A also includes a first inner notch 346 and a second inner notch 350 formed in the radially inward facing surface 330. Similarly, the first bus bar 310A includes a first outer notch 354, a second outer notch 358, and a third outer notch 362 formed in the radially outward facing surface 334. The first inner notch 346 is configured to receive a portion of one of the stator windings 298, but the winding portion remains spaced from the first bus bar 310A. In other words, a portion of the stator winding is positioned within the first inner notch 346 but remains spaced from the first bus bar 310A so as to remain electrically uncoupled to the first bus bar 310A. Likewise, portions of stator windings 298 are received in (but remain electrically uncoupled) the inner notches 346, 350 and the outer notches 354, 358, 362.

With continued reference to FIG. 13, the neutral bus bar 314 includes a first planar surface 366, a second planar surface 370, an inner circumferential surface 374, and an outer circumferential surface 378. In the illustrated embodiment, the inner circumferential surface 374 is circular. In other words, the inner circumferential surface 374 at least partially defines the center opening 316 of the bus bar assembly 306. The neutral bus bar 314 includes a plurality of grooves 382 formed in the outer circumferential surface 378 to receive a portion of a stator winding and to mechanically and electrically coupled the stator winding to the neutral bus bar 314. In the illustrated embodiment, the neutral bus bar 314 also includes a plurality of notches 386 formed in the outer circumferential surface 378 that receive a stator winding portion but does not mechanically or electrically couple the stator winding to the neutral bus bar 314. In other words, the notches 386 are similar to the notches 350, 354, 358, 362 of the first bus bar 310A and the grooves 382 are similar to the grooves 340, 344 of the first bus bar 310A.

With continued reference to FIGS. 12 and 13, in the illustrated embodiment, each phase of the three phases includes two radially opposed stator windings. The bus bars 310A, 310B, 310C mechanically and electrically connect the radially inward-most end terminals of two windings in a given phase (e.g., windings A-a, windings B-b, and windings C-c). The same busbar shape is used to connect the two windings of each phase. The radially outward-most end terminations of some windings (e.g., windings A, b, and C) is mechanically and electrically coupled to an inverter busbar (e.g., connection 106). In some embodiments, the inner housing 66 includes apertures 390 (FIGS. 7 and 8) that allow electrical connections (e.g., bus bars) from the drive 62 to pass into the inner housing 66 where they connect to stator windings 298. The radially outward-most end termination of windings a, B, and c are connected to the neutral bus bar 314 to form the wye-connection. In some embodiments, junctions of winding end terminations and busbars are brazed together or otherwise fastened together using solder or other suitable fastening means.

Figure 14:
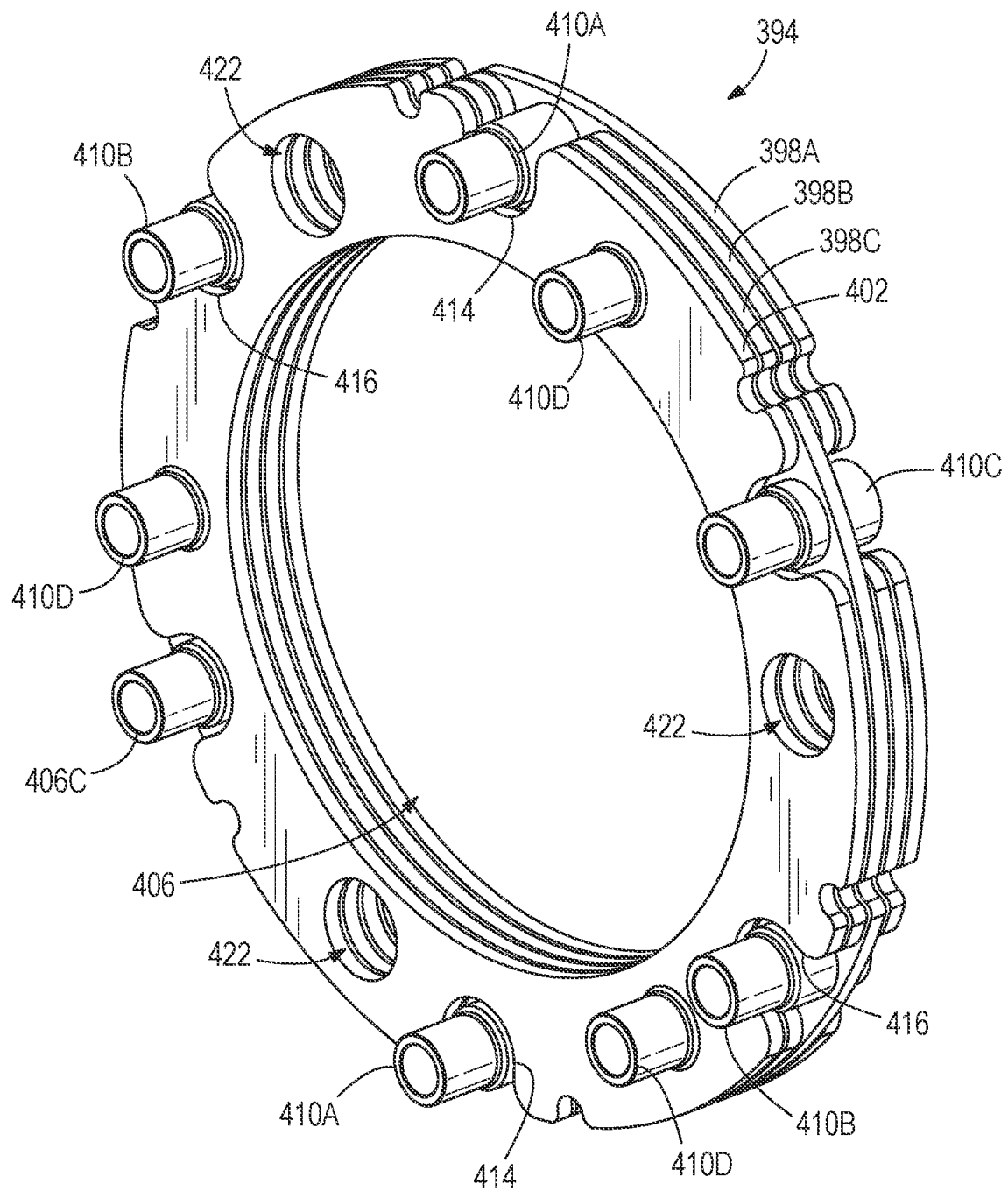
FIG. 14 is a perspective view of a bus bar assembly according to one aspect of the disclosure.
Figure 15:
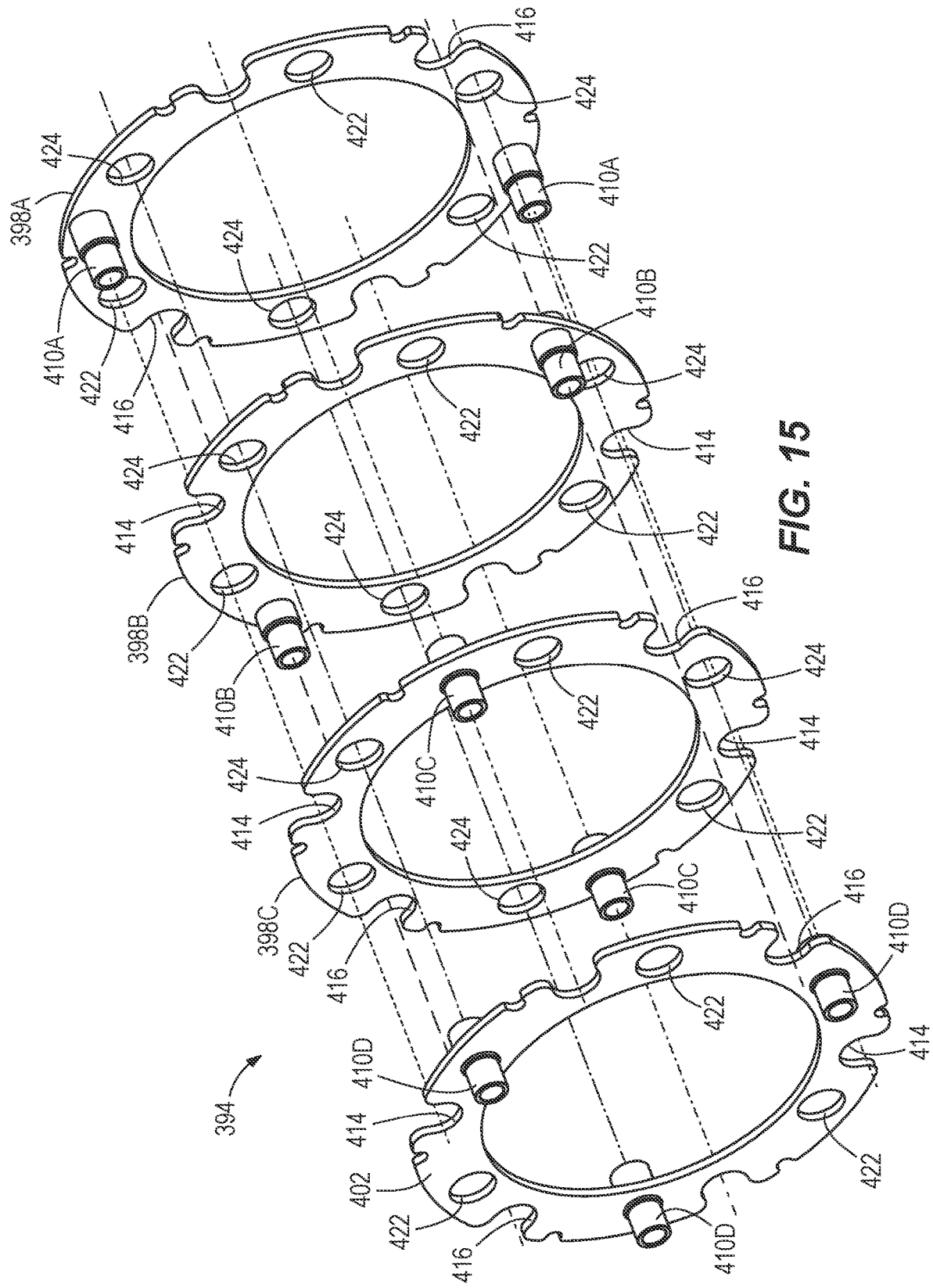
FIG. 15 is an exploded view of the bus bar assembly of FIG. 14.
Figure 16:
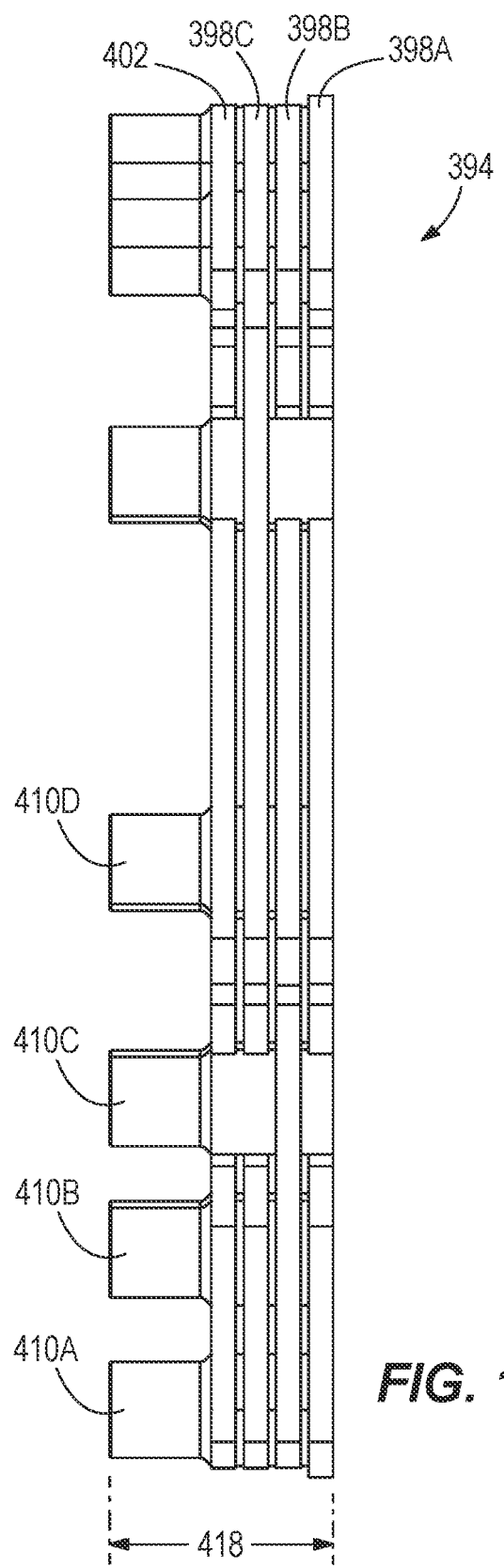
FIG. 16 is a side view of the bus bar assembly of FIG. 14.

With reference to FIGS. 14-16, a bus bar assembly 394 according to another aspect of the disclosure is illustrated. Like the bus bar assembly 306, the bus bar assembly 394 is electrically coupled to the plurality of stator winding 298 of the stator 70 and is positioned at axial end of the stator 70. The bus bar assembly 394 includes a first bus bar 398A, a second bus bar 398B, a third bus bar 398C, and a neutral bus bar 402. The first bus bar 398A, the second bus bar 398B, the third bus bar 398C, and the neutral bus bar 402 form an axial stack that extends along the axis 54. In other words, the bus bars 398A-398C and 402 are positioned along the axis 54. In the illustrated embodiment, a portion of the rotor 74 (e.g., the rotor shaft) extends through a center opening 406 in the bus bar assembly 394.

The bus bar assembly 394 includes a plurality of ferrules 410A, 410B, 410C, 410D mechanically and electrically coupled to the bus bars 398A, 398B, 398C, 402, respectively. For example, two ferrules 410A are coupled to the first bus bar 398A and the ferrules 410A extends through the entire axial stack of the bus bar assembly 394. Corresponding slots 414 are formed in the remaining bus bars 398B, 398C, and 402 to receive the two ferrules 410A of the first bus bar 398A, while not mechanically or electrically coupling the ferrules 410A to the remaining bus bars 398A, 398B, and 402.

Likewise, two ferrules 410B are coupled to the second bus bar 398B and extend through the entire axial stack of the bus bar assembly 394 and corresponding slots 416 are formed in the remaining bus bars 398A, 398C, and 402 to receive the ferrules 410B. In the illustrated embodiment, the neutral bus bar 402 includes three ferrules 410D that extend through the entire axial stack of the bus bar assembly 394. In particular, the ferrules 410D extend through apertures 424 formed in the remaining bus bars 398A, 398B, 398C. With reference to FIG. 16, each of the ferrules 410A-410D have a height dimension 418 that extends entirely through the bus bar assembly 394. In the illustrated embodiment, the height dimension 418 is the same for each of the ferrules 410A-410D.

During assembly, a portion of one of the stator windings 298 is positioned within one of the ferrules 410A-410D. In some embodiments, a terminating end of the stator winding is positioned within the ferrule and then the ferrule is mechanical crimped or crushed to mechanically and electrically coupled that stator winding with the ferrule.

With continue reference to FIGS. 14 and 15, a plurality of apertures 422 (i.e., cutouts) are formed in the first bus bar 398A, the second bus bar 398B, the third bus bar 398C, and the neutral bus bar 402. In the illustrated embodiments, the plurality of apertures 422 are axially aligned at three circumferential locations. In the illustrated embodiment, the apertures 422 provide a passageway for routing an electrical connection (i.e., cable, conductor, busbar, etc.) through the axial bus bar assembly 394. In some embodiments, the phase connections from the drive 62 extend through the axial bus bar assembly 394 without passing through the center opening 406 to connect to the stator windings 298.

In some embodiments, the electric motor 58 is a polyphase permanent magnet electric motor. In some embodiments, the electric motor 58 is configured to generate electricity by converting mechanical torque to generate electric power. Aspects of the disclosure are applicable to any type of electric machine topology.

In the illustrated embodiment, with the transmission 46 included, the integrated motor drive 10 has a power density (i.e., specific power) of at least approximately 13 kW/kg. In some embodiments, the integrated motor drive 10 is implanted in aircraft or aerospace propulsion where the metric of specific power is especially important. In other embodiments, the integrated motor drive 10 is used as a generator in, for example, a wind turbine application. As described herein, the high power density of the integrated motor drive 10 is achieved, in part, by synergistically integrating the drive 62 and the electric motor 58 within a shared outer housing 14 and the shared cooling system (e.g., the cooling channel 94).

The integrated electric motor drive 10 described herein provide several competitive advantages over conventional electric motors including that of providing four to five times higher specific power (kW/kg) than conventional propulsion systems. The present invention also provides an extremely high torque/inertia ratio to enable use in high acceleration spindle applications. Additionally, customers are not responsible for pairing or packaging motor and inverter, since both these components are integrated in the integrated motor drive 10. The integrated motor drive 10 also provides simple integration with connections to high voltage DC power source (e.g., battery, fuel cell, etc.) and coolant connections (e.g., connections 30, 34, 38). The integrated motor drive 10 also incorporates an easily adjustable gear reduction ratio by providing a modular transmission 46.

The integrated motor drive 10 is desirable for mass-sensitive, packaging-constrained, and/or high-performance applications. Non-limiting examples of such applications include hybrid-electric, battery electric, or fuel-cell-electric aircraft propulsion (drives a propeller or ducted fan), including rotorcraft and electric vertical take-off and landing ("eVTOL") aircraft. In some embodiments, the integrated motor drive 10 serves as a replacement for high torque hydraulic or pneumatic aerospace actuators. In some embodiments, the integrated motor drive 10 is used in unmanned aerial vehicle propulsion (military/defense) applications, urban air mobility, UAVs, military jets, select regional aircraft, motorsports, high performance automobiles, aerospace actuators, and commercial passenger aircraft.

One skilled in the art will readily appreciate that the present disclosure is well adapted to carry out the objects and obtain the ends and advantages mentioned, as well as those inherent herein. The present disclosure described herein are exemplary embodiments and are not intended as limitations on the scope of the present disclosure. Changes therein and other uses will occur to those skilled in the art which are encompassed within the spirit of the present disclosure as defined by the scope of the claims.

No admission is made that any reference, including any non-patent or patent document cited in this specification, constitutes prior art. In particular, it will be understood that, unless otherwise stated, reference to any document herein does not constitute an admission that any of these documents forms part of the common general knowledge in the art in the United States or in any other country. Any discussion of the references states what their authors assert, and the applicant reserves the right to challenge the accuracy and pertinence of any of the documents cited herein. All references cited herein are fully incorporated by reference, unless explicitly indicated otherwise. The present disclosure shall control in the event there are any disparities between any definitions and/or description found in the cited references.

Various features and advantages are set forth in the following claims.

What is claimed is:

1. An electric motor comprising:
a housing including an inner surface and an outer surface positioned radially outward from the inner surface;
a stator coupled to the inner surface; and
a cooling channel positioned within the housing between the inner surface and the outer surface; wherein the cooling channel includes:
a radially inward cooling surface,
a radially outward cooling surface parallel to the radially inward cooling surface,
a first side surface extending from the radially inward cooling surface, and
a second side surface extending from the radially outward cooling surface;
wherein the first side surface is non-orthogonal to the radially inward cooling surface, wherein the second side surface is non-orthogonal to the radially outward cooling surface, and wherein the first side surface and the second side surface intersect at a point;
wherein the housing is additively manufactured with the cooling channel formed therein.

2. The electric motor of claim 1, wherein the cooling channel helically extends along a longitudinal axis of the housing.

3. The electric motor of claim 1, wherein the outer surface is a first outer surface, and wherein the housing further includes a second outer surface.

4. The electric motor of claim 3, wherein the cooling channel is positioned between the inner surface and the second outer surface.

5. The electric motor of claim 3, wherein the first outer surface and the second outer surface are oriented to intersect at an angle of 60 degrees.

6. The electric motor of claim 3, wherein the first outer surface and the second outer surface are oriented to intersect at an angle of 30 degrees.

7. The electric motor of claim 3, wherein the housing further includes a third outer surface, a fourth outer surface, a fifth outer surface, and a sixth outer surface, wherein a first inverter branch is coupled to the first outer surface, and wherein a second inverter branch is coupled to the third outer surface, and a third inverter branch is coupled to the fifth outer surface, and wherein a first capacitor is coupled to the second outer surface, a second capacitor is coupled to the fourth outer surface, and a third capacitor is coupled to the sixth outer surface.

8. The electric motor of claim 1, wherein the housing further includes a coolant inlet and a coolant outlet additively manufactured therein, wherein the coolant inlet and the coolant outlet are fluidly coupled to the cooling channel.

9. The electric motor of claim 1, further comprising a liquid coolant configured to flow through the cooling channel.

10. The electric motor of claim 1, further comprising an airflow configured to flow through the cooling channel, and wherein the cooling channel is formed between a first fin and a second fin.

11. The electric motor of claim 1, further comprising a rotor positioned within the stator.

12. The electric motor of claim 1, wherein the housing includes an axial end face coupled to a transmission, wherein the transmission includes a transmission case, a plurality of gears, a bearing, and a lubricant; and wherein the transmission case is abutted against and thermally coupled to the axial end face.

13. A method of additively manufacturing an electric motor housing comprising:
forming a first axial end surface in a first layer;
forming a cooling channel, a radially inward surface, and a radially outer surface in a second layer, wherein the cooling channel is positioned between the radially inward surface and the radially outer surface; wherein the cooling channel includes:
a radially inward cooling surface,
a radially outward cooling surface parallel to the radially inward cooling surface,
a first side surface extending from the radially inward cooling surface, and
a second side surface extending from the radially outward cooling surface;
wherein the first side surface is non-orthogonal to the radially inward cooling surface, wherein the second side surface is non-orthogonal to the radially outward cooling surface, and wherein the first side surface and the second side surface intersect at a point; and
forming a second axial end surface in a third layer.

14. The method of claim 13, further including smoothing a surface by machining.

15. The method of claim 13, further including flushing a material out of the cooling channel.

16. The method of claim 13, wherein the cooling channel is formed without an additional support component.

17. The method of claim 13, wherein forming the first layer, the second layer, and the third layer is with direct metal laser sintering.

18. The method of claim 13, wherein forming the first layer, the second layer, and the third layer is with binder jetting.

* * * * *